(12) United States Patent
Yan et al.

(10) Patent No.: US 11,102,110 B2
(45) Date of Patent: Aug. 24, 2021

(54) DATA CENTER NETWORK (DCN) ARCHITECTURE AND COMMUNICATION

(71) Applicant: Huawei Technologies Co., Ltd., Shenzhen (CN)

(72) Inventors: Qinghua Yan, Beijing (CN); Guangping Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/749,634

(22) Filed: Jan. 22, 2020

(65) Prior Publication Data

US 2020/0162373 A1 May 21, 2020

Related U.S. Application Data

(63) Continuation of application No. PCT/CN2018/095578, filed on Jul. 13, 2018.

(30) Foreign Application Priority Data

Jul. 31, 2017 (CN) .......................... 201710639666.5

(51) Int. Cl.
*H04L 12/28* (2006.01)
*H04L 12/721* (2013.01)
(Continued)

(52) U.S. Cl.
CPC ............ *H04L 45/44* (2013.01); *H04L 41/044* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 2004/0136389 A1 | 7/2004 | Hunneyball | |
| 2005/0198371 A1* | 9/2005 | Smith | H04L 49/70 709/238 |
| 2007/0092248 A1 | 4/2007 | Jennen | |
| 2013/0083701 A1* | 4/2013 | Tomic | H04L 12/462 370/255 |

(Continued)

FOREIGN PATENT DOCUMENTS

| | | |
|---|---|---|
| CN | 103856402 A | 6/2014 |
| CN | 105099556 A | 11/2015 |

(Continued)

OTHER PUBLICATIONS

Dress, W., "Interconnects for Large Computer Systems," XP002699191, Aug. 21, 2012, 36 pages.

(Continued)

*Primary Examiner* — Phirin Sam
(74) *Attorney, Agent, or Firm* — Conley Rose, P.C.

(57) ABSTRACT

A DCN includes N first-level subnetworks, each first-level subnetwork includes N second-level subnetworks, each kth-level subnetwork includes N $(k+1)^{th}$-level subnetworks, each $(K-1)^{th}$-level subnetwork includes multiple switches, and the DCN is a K-level network; each switch in the DCN has K subnetwork identifiers, the K subnetwork identifiers are respectively used to indicate each level of subnetwork to which the switch belongs and a number in a $(K-1)^{th}$-level subnetwork to which the switch belongs; and the switch is separately interconnected with each switch in K direct connection switch groups, each direct connection switch group includes N−1 switches, and an $i^{th}$-level subnetwork identifier of the N−1 switches included in an $i^{th}$ direct connection switch group of the K direct connection switch groups is different from an $i^{th}$-level subnetwork identifier of the switch, and is the same as other K−1 subnetwork identifiers of the switch.

20 Claims, 13 Drawing Sheets

S1233

A first switch sends, over a first transmission subpath in the first transmission path group, an obtained piece of sub-traffic to a second switch whose plane identifier is the same as a plane identifier of the source switch, whose group identifier is the same as a group identifier of the destination switch, and whose intra-group identifier is the same as an intra-group identifier of the first switch, where the first switch is the source switch or any switch in the first direct connection switch group, and the first transmission subpath is a transmission path from the first switch to the second switch — S41

The second switch sends, over a second transmission subpath in the first transmission path group, the received piece of sub-traffic to a third switch whose plane identifier and group identifier are the same as a plane identifier and the group identifier of the destination switch and whose intra-group identifier is the same as the intra-group identifier of the second switch, where the third switch is the destination switch or any switch in the second direct connection switch group, and the second transmission subpath is a transmission path from the second switch to the third switch — S42

(51) Int. Cl.
*H04L 12/24* (2006.01)
*H04L 12/803* (2013.01)

(56) References Cited

U.S. PATENT DOCUMENTS

| | | | |
|---|---|---|---|
| 2014/0314099 A1* | 10/2014 | Dress | H04L 49/15 370/422 |
| 2015/0124826 A1* | 5/2015 | Edsall | H04L 45/66 370/392 |
| 2015/0263987 A1* | 9/2015 | Klein | H04L 47/00 709/226 |
| 2015/0312657 A1 | 10/2015 | Yan | |
| 2016/0080251 A1* | 3/2016 | Ramachandran | H04L 47/22 370/389 |
| 2016/0337726 A1 | 11/2016 | Yan | |
| 2017/0317972 A1* | 11/2017 | Bansal | H04L 61/2507 |
| 2017/0324480 A1* | 11/2017 | Elmirghani | H04J 14/0282 |
| 2017/0373942 A1* | 12/2017 | Ong | H04L 41/12 |
| 2018/0278331 A1 | 9/2018 | Cao et al. | |
| 2019/0222491 A1* | 7/2019 | Tomkins | H04L 41/5038 |

FOREIGN PATENT DOCUMENTS

| | | |
|---|---|---|
| CN | 106302252 A | 1/2017 |
| CN | 106817288 A | 6/2017 |

OTHER PUBLICATIONS

Kunishige, Y., et al., "Optical Network Configuration Methods Considering End-to-End Latency in Data Centers," XP032817242, Aug. 24, 2015, 6 pages.

* cited by examiner

S1233

```
┌─────────────────────────────────────────────────┐
│  A first switch sends, over a first transmission subpath in the first │
│  transmission path group, an obtained piece of sub-traffic to a second │
│  switch whose plane identifier is the same as a plane identifier of the │
│  source switch, whose group identifier is the same as a group identifier │
│  of the destination switch, and whose intra-group identifier is the same │
│  as an intra-group identifier of the first switch, where the first switch is │
│  the source switch or any switch in the first direct connection switch │
│  group, and the first transmission subpath is a transmission path from │
│                 the first switch to the second switch │
└─────────────────────────────────────────────────┘
```
S41

```
┌─────────────────────────────────────────────────┐
│   The second switch sends, over a second transmission subpath in the │
│  first transmission path group, the received piece of sub-traffic to a third │
│    switch whose plane identifier and group identifier are the same as a │
│    plane identifier and the group identifier of the destination switch and │
│  whose intra-group identifier is the same as the intra -group identifier of │
│    the second switch, where the third switch is the destination switch or │
│      any switch in the second direct connection switch group, and the │
│    second transmission subpath is a transmission path from the second │
│                    switch to the third switch │
└─────────────────────────────────────────────────┘
```
S42

```
A first switch sends, over a first transmission subpath in the first
transmission path group, an obtained piece of sub-traffic to a second
switch whose plane identifier is the same as a plane identifier of the
destination switch, whose group identifier is the same as a group
identifier of the source switch, and whose intra-group identifier is the
same as an intra-group identifier of the first switch, where the first
switch is the source switch or any switch in the first direct connection
switch group, and the first transmission subpath is a transmission path
from the first switch to the second switch
```
S51

```
The second switch sends, over a second transmission subpath in the
first transmission path group, the received piece of sub-traffic to a third
switch whose plane identifier and group identifier are the same as the
plane identifier and a group identifier of the destination switch and
whose intra-group identifier is the same as the intra-group identifier of
the second switch, where the third switch is the destination switch or
any switch in the second direct connection switch group, and the
second transmission subpath is a transmission path from the second
switch to the third switch
```
S52

FIG. 14

DATA CENTER NETWORK (DCN) ARCHITECTURE AND COMMUNICATION

CROSS-REFERENCE TO RELATED APPLICATIONS

This is a continuation of Int'l Patent App. No. PCT/CN2018/095578 filed on Jul. 13, 2018, which claims priority to Chinese Patent App. No. 201710639666.5 filed on Jul. 31, 2017, which are incorporated by reference.

TECHNICAL FIELD

Embodiments of this disclosure relate to the communications field, and more specifically, to a data center network DCN, a traffic transmission method in the DCN, and a switch.

BACKGROUND

At present, with development of network communication, traffic and bandwidth of a data center grow exponentially, and large bandwidth and a high scalability capability have become a top demand of a data center customer. A data center network (DCN) based on a Clos architecture is getting more widely deployed due to excellent scalability, a plurality of equal-cost paths, and the like.

However, a Clos-based data center uses an aggregated structure from a top-of-rack (ToR) switch to a core switch. As a proportion of east-west traffic increases, port density and a capacity of the core switch become a bottleneck for a network-wide switching capacity.

Therefore, a new network architecture is needed to resolve the foregoing problem.

SUMMARY

Embodiments of this disclosure provide a DCN, a traffic transmission method in the DCN, and a switch, to avoid a bottleneck problem of a network-wide switching capacity caused by port density and a capacity of a core switch in an aggregated data center.

According to a first aspect, a data center network DCN is provided, including: N first-level subnetworks, where each first-level subnetwork includes N second-level subnetworks, each $k^{th}$-level subnetwork includes N $(k+1)^{th}$-level subnetworks, each $(K-1)^{th}$-level subnetwork includes at least one switch, N, K, and k are integers, N≥2, K≥2, 1<k<K, and the DCN is a K-level network; each switch in the DCN has K subnetwork identifiers, where the K subnetwork identifiers are respectively used to indicate each level of subnetwork to which the switch belongs and a number of the switch in a $(K-1)^{th}$-level subnetwork to which the switch belongs; and the switch is separately interconnected with each switch in K direct connection switch groups, where each direct connection switch group includes N−1 switches, an $i^{th}$-level subnetwork identifier of the N−1 switches included in an $i^{th}$ direct connection switch group of the K direct connection switch groups is different from an $i^{th}$-level subnetwork identifier of the switch, and is the same as other K−1 subnetwork identifiers of the switch, and i=1, . . . , and K.

Therefore, the DCN in this embodiment of this disclosure is a distributed structure, the distributed structure may also be referred to as a K-level MESH structure, and a connection between a switch and another switch may be referred to as a distributed connection or a MESH connection. In the DCN, each switch is equal in status, and there is no role of a core switch in a conventional Clos structure, helping avoid a bottleneck problem of a network-wide capacity caused by port density and a capacity of the core switch.

Alternatively, a distributed network architecture in this embodiment of this disclosure can distribute a network-wide switching capacity to each switch, reducing a capacity requirement for a single switch, and avoiding a bottleneck problem of a switching capacity caused by an aggregated structure.

In a possible implementation of the first aspect, the switch includes K interconnection port groups, each interconnection port group includes N−1 interconnection ports, the K interconnection port groups correspond to the K direct connection switch groups, and the N−1 interconnection ports in each interconnection port group are respectively configured to connect N−1 switches in one corresponding direct connection switch group.

Each switch can implement a connection to the K direct connection switch groups by using the K interconnection port groups, and there is only one different subnetwork identifier between K subnetwork identifiers of each switch in the K direct connection switch groups and K subnetwork identifiers of the switch. Therefore, it may be understood that if only one subnetwork identifier between two switches is different, the two switches are connected through an interconnection port of the K interconnection port groups, or in other words, there is a one-hop reachable path between the two switches. Each interconnection port includes a pair of ports (including an input port and an output port), and correspondingly, the K interconnection port groups include K input port groups and K output port groups.

An interconnection between each switch and the K direct connection switch groups can be implemented by using the K interconnection port groups of each switch, and a direct interconnection or an indirect interconnection between every two switches in the DCN can be further implemented. That is, there is a one-hop or multiple-hop reachable transmission path between every two switches in the DCN. Each switch corresponds to one direct connection switch group in the DCN to which the switch belongs, and in each level of subnetwork. Therefore, when traffic is forwarded from a source switch to a destination switch, a traffic forwarding path from the source switch to the destination switch may be designed based on an interconnection structure between switches in the DCN.

In a possible implementation of the first aspect, K is 3, the first-level subnetwork of the DCN is a plane, the second-level subnetwork is a group, an identifier of the first-level subnetwork is a plane identifier, an identifier of the second-level subnetwork is a group identifier, and an identifier of a third-level subnetwork is an intra-group identifier; and a first direct connection switch group in the K direct connection switch groups is a planar direct connection switch group and includes N−1 switches whose plane identifier is different from a plane identifier of the switch and whose group identifier and intra-group identifier are the same as a group identifier and an intra-group identifier of the switch, a second direct connection switch group is an inter-group direct connection switch group and includes N−1 switches whose group identifier is different from the group identifier of the switch and whose plane identifier and intra-group identifier are the same as the plane identifier and the intra-group identifier of the switch, and a third direct connection switch group is an intra-group direct connection switch group and includes N−1 switches whose intra-group identifier is different from the intra-group identifier of the switch and whose plane identifier and group identifier are the same as the plane identifier and the group identifier of the switch.

In a possible implementation of the first aspect, the K interconnection port groups include an inter-plane interconnection port group, an inter-group interconnection port group, and an intra-group interconnection port group, the inter-plane interconnection port group includes N−1 inter-plane interconnection ports, the inter-group interconnection port group includes N−1 inter-group interconnection ports, and the intra-group interconnection port group includes N−1 intra-group interconnection port; and the N−1 inter-plane interconnection ports are configured to connect the N−1 switches in the planar direct connection switch group, the N−1 inter-group interconnection ports are configured to connect the N−1 switches in the inter-group direct connection switch group, and the N−1 intra-group interconnection ports are configured to connect the N−1 switches in the intra-group direct connection switch group.

In a possible implementation of the first aspect, the K interconnection port groups of the switch are connected to the K direct connection switch groups through K cyclic arrayed waveguide gratings CAWGs, each CAWG includes N input optical fibers and N output optical fibers, and the N−1 interconnection ports in each interconnection port group of the switch include N−1 input ports and N−1 output ports; and the N−1 output ports in each interconnection port group of the switch are connected to an input optical fiber of a CAWG, and the N−1 input ports in the interconnection port group are connected to an output optical fiber of the CAWG.

For example, the switch may connect N−1 intra-group interconnection ports of the switch to a pair of optical fibers of the CAWG (including an input optical fiber and an output optical fiber), and a first switch in the intra-group direct connection switch group may also connect N−1 intra-group interconnection ports of the first switch to another pair of optical fibers of the CAWG. That is, both the switch and a switch in the intra-group direct connection switch group of the switch may be connected to a pair of optical fibers of the CAWG, so that an interconnection between the switch and the intra-group direct connection switch group can be implemented through the CAWG.

According to a second aspect, a traffic transmission method in a data center network DCN is provided, where the DCN includes: N first-level subnetworks, where each first-level subnetwork includes N second-level subnetworks, each kth-level subnetwork includes N $(k+1)^{th}$-level subnetworks, each $(K-1)^{th}$-level subnetwork includes at least one switch, N, K, and k are integers, N≥2, K≥2, 1<k<K, and the DCN is a K-level network; each switch in the DCN has K subnetwork identifiers, where the K subnetwork identifiers are respectively used to indicate each level of subnetwork to which the switch belongs and a number of the switch in a $(K-1)^{th}$-level subnetwork to which the switch belongs; and the switch is separately interconnected with each switch in K direct connection switch groups, where each direct connection switch group includes N−1 switches, an $i^{th}$-level subnetwork identifier of the N−1 switches included in an $i^{th}$ direct connection switch group of the K direct connection switch groups is different from an $i^{th}$-level subnetwork identifier of the switch, and is the same as other K−1 subnetwork identifiers of the switch, and i=1, . . . , and K; and the method includes: receiving, by a source switch, target traffic sent by a server; determining, by the source switch, a target transmission path from the source switch to a destination switch based on a pre-stored transmission path set, where the pre-stored transmission path set includes a transmission path between any two switches in the DCN, and the transmission path between every two switches includes a plurality of transmission paths; and sending, by the source switch, the target traffic to the destination switch over the target transmission path, where the source switch is any switch in the DCN, and the destination switch is any switch except the source switch in the DCN.

Therefore, in the traffic transmission method in this embodiment of this disclosure, the target transmission path from the source switch to the destination switch is predetermined. When traffic is forwarded, the target traffic may be forwarded only by needing to query the pre-stored transmission path set, so that a traffic forwarding delay can be shortened.

In a possible implementation of the second aspect, the method further includes: generating the target transmission path from the source switch to the destination switch; and adding the target transmission path to the transmission path set.

In a possible implementation of the second aspect, the generating the target transmission path from the source switch to the destination switch includes: determining a first path set, where the first path set includes a one-hop reachable transmission path between switches in the DCN; determining a first switch set and a second switch set, where the first switch set includes the source switch and all direct connection switches of the source switch, and the second switch set includes the destination switch and all direct connection switches of the destination switch; determining a second path set from a switch in the first switch set to a switch in the second switch set based on the first path set; and determining the target transmission path from the source switch to the destination switch based on the first path set and the second path set, where the target transmission path includes a plurality of transmission paths from the source switch to the destination switch.

In a possible implementation of the second aspect, the determining the target transmission path from the source switch to the destination switch based on the first path set and the second path set includes: determining a first transmission path group in the second path set, where the first transmission path group includes N transmission paths with a minimum hop count from the source switch and a first direct connection switch group interconnected with the source switch to the destination switch and a second direct connection switch group interconnected with the destination switch, the first direct connection switch group is any direct connection switch group interconnected with the source switch, and the second direct connection switch group is any direct connection switch group interconnected with the destination switch; determining, in the first path set, a second transmission path group from the source switch to the first direct connection switch group, and a third transmission path group from the second direct connection switch group to the destination switch, where the second transmission path group includes N−1 transmission paths from the source switch to the first direct connection switch group, and the third transmission path group includes N−1 transmission paths from the second direct connection switch group to the destination switch; and determining the target transmission path from the source switch to the destination switch based on the second transmission path group, the first transmission path group, and the third transmission path group.

The first direct connection switch group includes the source switch and N−1 switches directly connected to the source switch, that is, the first switch set includes N switches. The second direct connection switch group includes the destination switch and N−1 switches directly connected to the destination switch, that is, the second switch set includes N switches. The N transmission paths included in the first transmission path group are respectively configured to connect the N switches in the first switch set to the N switches in the second switch set, or in other words, the switch in the first switch set may transmit traffic to a corresponding switch in the second switch set over a corresponding transmission path.

Optionally, the first direct connection switch group is N−1 direct connection switches of the source switch. For example, the first direct connection switch group may be an intra-group direct connection switch group, an inter-group direct connection switch group or a planar direct connection switch group of the source switch, and in the first hop, the source switch may separately forward N−1 pieces of sub-traffic to the N−1 switches of the first direct connection switch group. The second direct connection switch group is N−1 direct connection switches of the destination switch. For example, the second direct connection switch group may be an intra-group direct connection switch group, an inter-group direct connection switch group or a planar direct connection switch group of the destination switch, and in a last hop, the N−1 switches in the second direct connection switch group forward the N−1 pieces of sub-traffic to the destination switch.

In a possible implementation of the second aspect, the sending, by the source switch, the target traffic to the destination switch over the target transmission path includes: performing, by the source switch, traffic balancing on the target traffic to obtain N pieces of sub-traffic; separately sending, by the source switch, N−1 pieces of sub-traffic in the N pieces of sub-traffic to N−1 direct connection switches in the first direct connection switch group over the N−1 transmission paths in the second transmission path group; separately sending, by the source switch and the first direct connection switch group, the N pieces of sub-traffic to the destination switch and N−1 direct connection switches in the second direct connection switch group over the N transmission paths in the first transmission path group; sending, by the N−1 switches in the second direct connection switch group, the N−1 pieces of sub-traffic to the destination switch over the N−1 transmission paths in the third transmission path group; and aggregating, by the destination switch, the received N pieces of sub-traffic to obtain the target traffic.

In a possible implementation of the second aspect, K is 3, the first-level subnetwork of the DCN is a plane, the second-level subnetwork is a group, an identifier of the first-level subnetwork is a plane identifier, an identifier of the second-level subnetwork is a group identifier, and an identifier of a third-level subnetwork is an intra-group identifier; and a first direct connection switch group in the K direct connection switch groups is a planar direct connection switch group and includes N−1 switches whose plane identifier is different from a plane identifier of the source switch and whose group identifier and intra-group identifier are the same as a group identifier and an intra-group identifier of the source switch, a second direct connection switch group is an inter-group direct connection switch group and includes N−1 switches whose group identifier is different from the group identifier of the source switch and whose plane identifier and intra-group identifier are the same as the plane identifier and the intra-group identifier of the source switch, and a third direct connection switch group is an intra-group direct connection switch group and includes N−1 switches whose intra-group identifier is different from the intra-group identifier of the source switch and whose plane identifier and group identifier are the same as the plane identifier and the group identifier of the source switch.

In a possible implementation of the second aspect, if the plane identifier of the source switch is different from a plane identifier of the destination switch, the first direct connection switch group is an intra-group direct connection switch group of the source switch, and the second direct connection switch group is an intra-group direct connection switch group of the destination switch; and the separately sending, by the source switch and the first direct connection switch group, the N pieces of sub-traffic to the destination switch and N−1 direct connection switches in the second direct connection switch group over the first transmission path group includes: sending, by a first switch over a first transmission sub-path in the first transmission path group, an obtained piece of sub-traffic to a second switch whose plane identifier is the same as the plane identifier of the source switch, whose group identifier is the same as a group identifier of the destination switch, and whose intra-group identifier is the same as an intra-group identifier of the first switch, where the first switch is the source switch or any switch in the first direct connection switch group, and the first transmission sub-path is a transmission path from the first switch to the second switch; and sending, by the second switch over a second transmission sub-path in the first transmission path group, the received piece of sub-traffic to a third switch whose plane identifier and group identifier are the same as the plane identifier and the group identifier of the destination switch and whose intra-group identifier is the same as the intra-group identifier of the second switch, where the third switch is the destination switch or any switch in the second direct connection switch group, and the second transmission sub-path is a transmission path from the second switch to the third switch.

In general, the foregoing traffic transmission method may include the following steps:

First, intra-group traffic balancing is performed on the target traffic. The source switch distributes the N pieces of sub-traffic to N switches in a group.

Next, inter-group traffic forwarding is performed. The N switches that obtain the pieces of sub-traffic separately forward the obtained pieces of sub-traffic to a group of switches whose plane identifier is the same as the plane identifier of the source switch and whose group identifier is the same as the group identifier of the destination switch.

Then, inter-plane traffic forwarding is performed. The N switches that obtain the pieces of sub-traffic forward the obtained pieces of sub-traffic to a group of switches whose plane identifier and group identifier are the same as the plane identifier and the group identifier of the destination switch.

Finally, intra-group traffic aggregation is performed. The N−1 switches except the destination switch in the group to which the destination switch belongs forward the obtained pieces of sub-traffic to the destination switch, and the destination switch aggregates the obtained N pieces of sub-traffic to obtain the target traffic.

In a possible implementation of the second aspect, if the plane identifier of the source switch is different from a plane identifier of the destination switch, the first direct connection switch group is an intra-group direct connection switch group of the source switch, and the second direct connection switch group is an intra-group direct connection switch group of the destination switch; and the separately sending, by the source switch and the first direct connection switch group, the N pieces of sub-traffic to the destination switch and the second direct connection switch group over the first transmission path group includes: sending, by a first switch over a first transmission sub-path in the first transmission path group, an obtained piece of sub-traffic to a second switch whose plane identifier is the same as the plane identifier of the destination switch, whose group identifier is the same as the group identifier of the source switch, and whose intra-group identifier is the same as an intra-group identifier of the first switch, where the first switch is the source switch or any switch in the first direct connection switch group, and the first transmission sub-path is a transmission path from the first switch to the second switch; and sending, by the second switch over a second transmission sub-path in the first transmission path group, the received piece of sub-traffic to a third switch whose plane identifier and group identifier are the same as the plane identifier and a group identifier of the destination switch and whose intra-group identifier is the same as the intra-group identifier of the second switch, where the third switch is the destination switch or any switch in the second direct connection switch group, and the second transmission sub-path is a transmission path from the second switch to the third switch.

In general, the foregoing traffic transmission method may include the following steps:

First, intra-group balancing is performed on the target traffic. The source switch distributes the N pieces of sub-traffic to N switches in a group.

Next, inter-plane traffic forwarding is performed. The N switches that obtain the pieces of sub-traffic separately forward the N pieces of sub-traffic to a group of switches whose plane identifier is the same as the plane identifier of the destination switch and whose group identifier is the same as the group identifier of the source switch.

Then, inter-group traffic forwarding is performed. The N switches that obtain the pieces of sub-traffic forward the obtained pieces of sub-traffic to a group of switches whose plane identifier and group identifier are the same as the plane identifier and the group identifier of the destination switch.

Finally, intra-group traffic aggregation is performed. The N−1 switches except the destination switch in the group to which the destination switch belongs forward the obtained pieces of sub-traffic to the destination switch, and the destination switch aggregates the obtained N pieces of sub-traffic to obtain the target traffic.

In a possible implementation of the second aspect, the first switch set includes K direct connection switch groups interconnected with the source switch, and the second switch set includes K direct connection switch groups interconnected with the destination switch.

A first direct connection switch group in the K direct connection switch groups is a planar direct connection switch group and includes N−1 switches whose plane identifier is different from a plane identifier of the switch and whose group identifier and intra-group identifier are the same as a group identifier and an intra-group identifier of the switch, a second direct connection switch group is an inter-group direct connection switch group and includes N−1 switches whose group identifier is different from the group identifier of the switch and whose plane identifier and intra-group identifier are the same as the plane identifier and the intra-group identifier of the switch, and a third direct connection switch group is an intra-group direct connection switch group and includes N−1 switches whose intra-group identifier is different from the intra-group identifier of the switch and whose plane identifier and group identifier are the same as the plane identifier and the group identifier of the switch.

In a possible implementation of the second aspect, the K interconnection port groups include an inter-plane interconnection port group, an inter-group interconnection port group, and an intra-group interconnection port group, the inter-plane interconnection port group includes N−1 inter-plane interconnection ports, the inter-group interconnection port group includes N−1 inter-group interconnection ports, and the intra-group interconnection port group includes N−1 intra-group interconnection port; and the N−1 inter-plane interconnection ports are configured to connect the N−1 switches in the planar direct connection switch group, the N−1 inter-group interconnection ports are configured to connect the N−1 switches in the inter-group direct connection switch group, and the N−1 intra-group interconnection ports are configured to connect the N−1 switches in the intra-group direct connection switch group.

According to a third aspect, a switch is provided, including: K interconnection port groups, configured to respectively connect K direct connection switch groups of the switch; an access port, configured to connect a server; and a switching chip, configured to: obtain, through the access port, target traffic sent by the server, determine a target transmission path from the switch to a destination switch based on a pre-stored transmission path set, and send the target traffic to the destination switch over the target transmission path, where the pre-stored transmission path set includes a transmission path between any two switches in a data center network DCN in which the switch is located, the transmission path between every two switches includes a plurality of transmission paths, the DCN is a K-level network, the switch has K subnetwork identifiers, the K subnetwork identifiers are respectively used to indicate each level of subnetwork to which the switch belongs and a number of the switch in a $(K-1)^{th}$-level subnetwork to which the switch belongs, an $i^{th}$-level subnetwork identifier of N−1 switches included in an $i^{th}$ direct connection switch group of the K direct connection switch groups is different from an $i^{th}$-level subnetwork identifier of the switch, and is the same as other K−1 subnetwork identifiers of the switch, N and K are integers, N≥2, K≥2, and i=1, . . . , and K.

In a possible implementation of the third aspect, the switch further includes a processor, configured to: generate the target transmission path from the switch to the destination switch; and add the target transmission path to the transmission path set.

In a possible implementation of the third aspect, when generating the target transmission path from the switch to the destination switch, the processor is configured to: determine a first path set, where the first path set includes a one-hop reachable transmission path between switches in the DCN; determine a first switch set and a second switch set, where the first switch set includes the switch and all direct connection switches of the switch, and the second switch set includes the destination switch and all direct connection switches of the destination switch; determine a second path set from a switch in the first switch set to a switch in the second switch set based on the first path set; and determine the target transmission path from the switch to the destination switch based on the first path set and the second path set, where the target transmission path includes a plurality of transmission paths from the switch to the destination switch.

In a possible implementation of the third aspect, when determining the target transmission path from the switch to the destination switch based on the first path set and the second path set, the processor is configured to: determine a first transmission path group in the second path set, where the first transmission path group includes N transmission paths with a minimum hop count from the switch and a first direct connection switch group interconnected with the switch to the destination switch and a second direct connection switch group interconnected with the destination switch, the first direct connection switch group is any direct connection switch group interconnected with the switch, and the second direct connection switch group is any direct connection switch group interconnected with the destination switch; determine, in the first path set, a second transmission path group from the switch to the first direct connection switch group, and a third transmission path group from the second direct connection switch group to the destination switch, where the second transmission path group includes N−1 transmission paths from the switch to the first direct connection switch group, and the third transmission path group includes N−1 transmission paths from the second direct connection switch group to the destination switch; and determine the target transmission path from the switch to the destination switch based on the second transmission path group, the first transmission path group, and the third transmission path group.

In a possible implementation of the third aspect, when sending the target traffic to the destination switch over the target transmission path, the switching chip is configured to: perform traffic balancing on the target traffic to obtain N pieces of sub-traffic; separately send N−1 pieces of sub-traffic in the N pieces of sub-traffic to N−1 direct connection switches in the first direct connection switch group over the N−1 transmission paths in the second transmission path group; and send, to another direct connection switch of the switch, sub-traffic forwarded by the switch, where the another direct connection switch does not belong to the first direct connection switch group.

In a possible implementation of the third aspect, K is 3, the first-level subnetwork of the DCN is a plane, the second-level subnetwork is a group, an identifier of the first-level subnetwork is a plane identifier, an identifier of the second-level subnetwork is a group identifier, and an identifier of a third-level subnetwork is an intra-group identifier; and a first direct connection switch group in the K direct connection switch groups is a planar direct connection switch group and includes N−1 switches whose plane identifier is different from a plane identifier of the switch and whose group identifier and intra-group identifier are the same as a group identifier and an intra-group identifier of the switch, a second direct connection switch group is an inter-group direct connection switch group and includes N−1 switches whose group identifier is different from the group identifier of the switch and whose plane identifier and intra-group identifier are the same as the plane identifier and the intra-group identifier of the switch, and a third direct connection switch group is an intra-group direct connection switch group and includes N−1 switches whose intra-group identifier is different from the intra-group identifier of the switch and whose plane identifier and group identifier are the same as the plane identifier and the group identifier of the switch.

Therefore, a DCN formed by a switch with the foregoing structure may be considered as a huge data exchange device, and each switch in a network architecture may be considered as an interface board of the data exchange device. Therefore, the data exchange device does not have an independent interface board and control board, and all exchange functions and control functions are distributed in each interface board, namely, the switch, so that there is no role of a core switch in a Clos structure, helping avoid a bottleneck problem of a network-wide capacity caused by port density and a capacity of the core switch.

According to a fourth aspect, a computer-readable medium is provided, where the computer-readable medium stores program code executed by a network device, and the program code includes an instruction used to perform the method in the second aspect or any possible implementation of the second aspect.

According to a fifth aspect, a computer program product is provided, where the computer program product includes computer program code. When executed by a computer, the computer program code enables the computer to perform the method in the second aspect or any possible implementation of the second aspect.

BRIEF DESCRIPTION OF DRAWINGS

FIG. 13 is a schematic flowchart of an example of a traffic transmission method in a DCN according to an embodiment of this disclosure; and FIG. 14 is a schematic flowchart of another example of a traffic transmission method in a DCN according to an embodiment of this disclosure.

DESCRIPTION OF EMBODIMENTS

The following describes technical solutions of this disclosure with reference to accompanying drawings.

Figure 1:
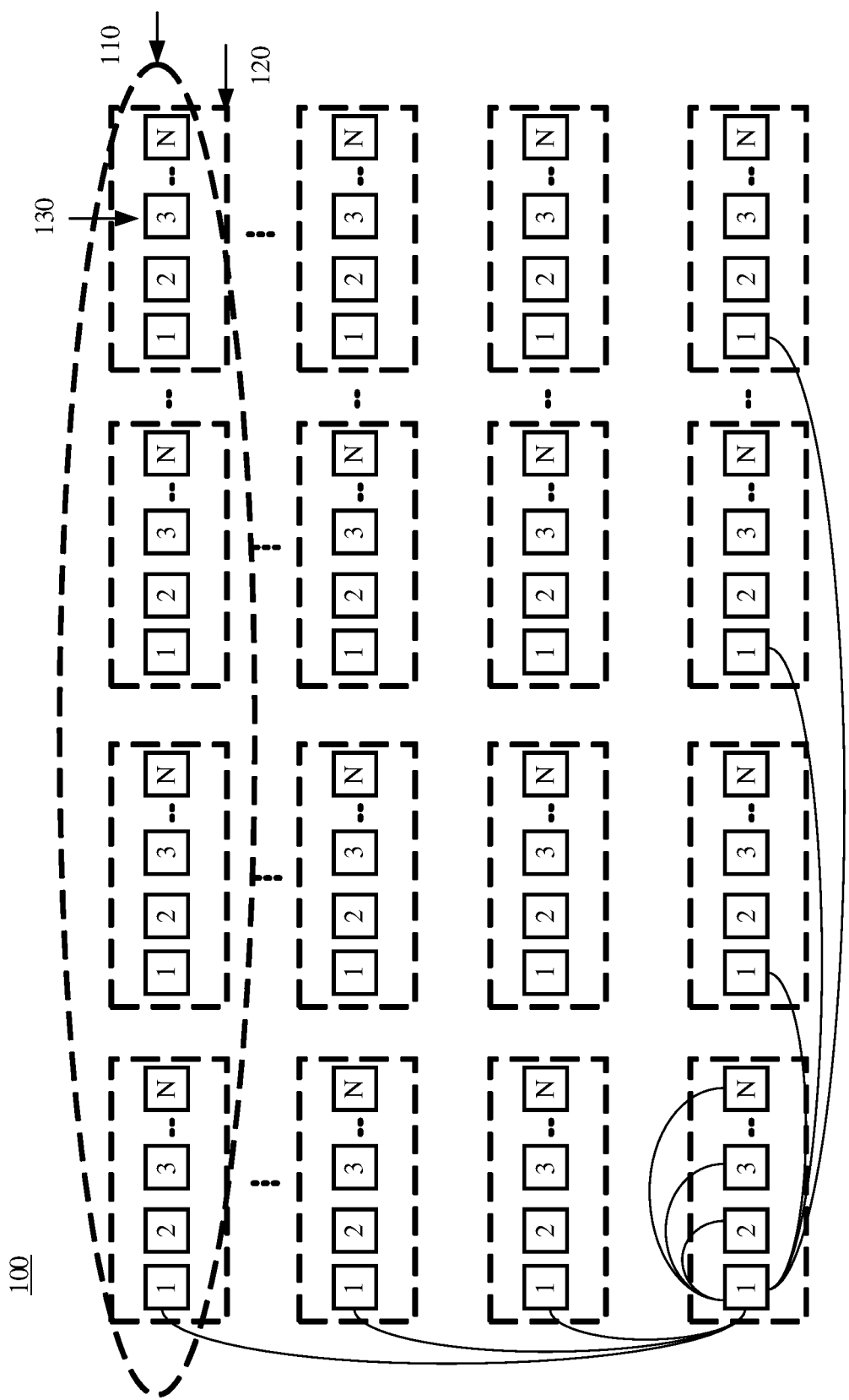
FIG. 1 is a schematic structural diagram of a DCN according to an embodiment of this disclosure.

FIG. 1 is a schematic diagram of a DCN 100 according to an embodiment of this disclosure.

As shown in FIG. 1, the DCN 100 includes: N first-level subnetworks 110, where each first-level subnetwork 110 includes N second-level subnetworks 120, each $k^{th}$-level subnetwork includes N $(k+1)^{th}$-level subnetworks, each $(K-1)^{th}$-level subnetwork includes at least one switch 130, N, K, and k are integers, N≥2, K≥2, and 1<k<K. The DCN is a K-level network. A smallest network unit of the DCN is a $(K-1)^{th}$-level subnetwork, N $(K-1)^{th}$-level subnetworks form a $(K-2)^{th}$-level subnetwork, N $(K-2)^{th}$-level subnetworks form a $(K-3)^{th}$-level subnetwork, ..., the N second-level subnetworks form a first-level subnetwork, and the N first-level subnetworks form the DCN.

Optionally, when K=3, for ease of differentiation and description, the first-level subnetwork is denoted as a plane, and the second-level subnetwork is denoted as a group. In an implementation of this case, the DCN includes N planes, each plane includes N groups, and each group includes N switches.

In the DCN, K subnetwork identifiers are used to identify each switch 130, and the K subnetwork identifiers are respectively used to indicate the first-level subnetwork, the second-level subnetwork, ..., to which the switch 130 belongs and a number of the switch 130 in the $(K-1)^{th}$-level subnetwork. That is, the K subnetwork identifiers are respectively used to indicate each level of subnetwork to which the switch belongs and the number of the switch in the $(K-1)^{th}$-level subnetwork to which the switch belongs.

In other words, the K subnetwork identifiers of each switch may be understood as coordinates of the switch in the DCN, and the first-level subnetwork, the second-level subnetwork, ..., and the $(K-1)^{th}$-level subnetwork to which the switch belongs and the number of the switch in the $(K-1)^{th}$-level subnetwork may be determined based on the K subnetwork identifiers of the switch. For the K subnetwork identifiers of each switch, the first K-1 subnetwork identifiers are used to identify subnetworks at different levels, and a $K^{th}$ subnetwork identifier is used to indicate the number of the switch in the $(K-1)^{th}$-level subnetwork to which the switch belongs. It should be noted that the $K^{th}$ subnetwork identifier is essentially a device identifier that is used to indicate a switch and is not used to indicate a subnetwork. A subnetwork identifier is uniformly used in this disclosure for ease of description.

Optionally, when K=3, for ease of differentiation and description, the K subnetwork identifiers are denoted as a plane identifier, a group identifier, and an intra-group identifier respectively, to respectively identify a plane and a group to which the switch belongs and an intra-group number. Therefore, the plane and the group to which the switch belongs and the intra-group number may be determined based on the K subnetwork identifiers.

In the DCN, each switch is separately interconnected with each switch in K direct connection switch groups, where each direct connection switch group includes N-1 switches, the K direct connection switch groups interconnected with different switches are different, an $i^{th}$-level subnetwork identifier of the N-1 switches included in an $i^{th}$ direct connection switch group of the K direct connection switch groups is different from an $i^{th}$-level subnetwork identifier of the switch, other K-1 subnetwork identifiers of the N-1 switches included in the $i^{th}$ direct connection switch group are the same as other K-1 subnetwork identifiers of the switch, and i=1, ..., and K. There is no other switch between each switch in a direct connection switch group of a switch and the switch.

For example, as shown in FIG. 1, coordinates of a lower left switch are denoted as (1, 1, 1), that is, a plane identifier is 1, a group identifier is 1, and an intra-group identifier is 1. The plane identifier is incremented upward, and the group identifier is incremented rightward.

Then, a first direct connection switch group of the switch (1, 1, 1) includes N-1 switches whose plane identifier is different from the plane identifier of the switch (1, 1, 1) and whose group identifier and intra-group identifier are the same as the group identifier and the intra-group identifier of the switch (1, 1, 1), that is, includes a switch (W, 1, 1), where 2≤W≤N. The first direct connection switch group includes the N-1 switches with coordinates being from (2, 1, 1) to (N, 1, 1).

A second direct connection switch group of the switch (1, 1, 1) includes N-1 switches whose group identifier is different from the group identifier of the switch (1, 1, 1) and whose plane identifier and intra-group identifier are the same as the plane identifier and the intra-group identifier of the switch (1, 1, 1), that is, includes a switch (1, Q, 1), where 2≤Q≤N. The second direct connection switch group includes the N-1 switches with coordinates being from (1, 2, 1) to (1, N, 1).

A third direct connection switch group of the switch (1, 1, 1) includes N-1 switches whose intra-group identifier is different from the intra-group identifier of the switch (1, 1, 1) and whose plane identifier and group identifier are the same as the plane identifier and the group identifier of the switch (1, 1, 1), that is, includes a switch (1, 1, P), where 2≤P≤N. The third direct connection switch group includes the N-1 switches with coordinates being from (1, 1, 2) to (1, 1, N).

In the DCN, each switch is interconnected with the K direct connection switch groups, and there is only one different subnetwork identifier between K subnetwork identifiers of a switch in each direct connection switch group and K subnetwork identifiers of the switch. There is only one different first-level subnetwork identifier between K subnetwork identifiers of a switch in the first direct connection switch group and the K subnetwork identifiers of the switch. There is only one different second-level subnetwork identifier between K subnetwork identifiers of a switch in the second direct connection switch group and the K subnetwork identifiers of the switch. There is only one different $K^{th}$-level subnetwork identifier between K subnetwork identifiers of a switch in a $K^{th}$ direct connection switch group and the K subnetwork identifiers of the switch.

Optionally, when K=3, the first direct connection switch group includes N-1 switches whose plane identifier is different from the plane identifier of the switch and whose group identifier and intra-group identifier are the same as the group identifier and the intra-group identifier of the switch, and is referred to as a planar direct connection switch group; the second direct connection switch group includes N-1 switches whose group identifier is different from the group identifier of the switch and whose plane identifier and intra-group identifier are the same as the plane identifier and the intra-group identifier of the switch, and is referred to as an inter-group direct connection switch group; and the third direct connection switch group includes N-1 switches whose intra-group identifier is different from the intra-group identifier of the switch and whose plane identifier and group identifier are the same as the plane identifier and the group identifier of the switch, and is referred to as an intra-group direct connection switch group. Each switch in the planar direct connection switch group is referred to as a planar direct connection switch of the switch, each switch in the inter-group direct connection switch group is referred to as an inter-group direct connection switch of the switch, and each switch in the intra-group direct connection switch group is referred to as an intra-group direct connection switch of the switch.

Therefore, the DCN in this embodiment of this disclosure is a distributed structure, the distributed structure may also be referred to as a K-level MESH structure, and a connection between a switch and another switch may be referred to as a distributed connection or a MESH connection. In the DCN, each switch is equal in status, and there is no role of a core switch in a Clos structure, helping avoid a bottleneck problem of a network-wide capacity caused by port density and a capacity of the core switch.

$N^K$ switches are included in the K-level MESH structure. If each switch is connected to N servers, a network-wide switching capacity is $N^{K+1}$×port capacity. For example, when K=2, the DCN is a second-level MESH structure, and the DCN includes $N^2$ switches. Each switch is connected to N servers, and then the network-wide switching capacity is $N^3$×port capacity. Alternatively, if K=3, the DCN is a three-level MESH structure, and the DCN includes $N^3$ switches. Each switch is connected to N servers, and then the network-wide switching capacity is $N^4$×port capacity.

K=3 and N=48 are used as an example, a quantity of switches included in the DCN is 110,592, and a quantity of connected servers is 5,308,416. If a port connection is implemented through 10 Gigabit Ethernet (GbE), the network-wide switching capacity is approximately 53 petabits per second (Pbps). If a quantity of ports of each switch is 4N, that is, a quantity of connected servers is 4N, and it can be equivalent to implementing 192 10GE ports, and a switching capacity of each switch is 1.92 terabits per second (Tbps). If a port rate of a server is 25GE, the network-wide switching capacity can reach 133 Pbps. In this case, the switching capacity of each switch only needs to be 4.8 Tb. Therefore, a distributed network architecture in this embodiment of this disclosure can distribute the network-wide switching capacity to each switch, reducing a capacity requirement for a single switch, and avoiding a bottleneck problem of the switching capacity caused by an aggregated structure.

In this embodiment of this disclosure, each switch in the DCN includes K interconnection port groups, each interconnection port group includes N−1 interconnection ports, the K interconnection port groups correspond to the K direct connection switch groups, and the N−1 interconnection ports in each interconnection port group are respectively configured to connect N−1 switches in one corresponding direct connection switch group.

Each switch can implement a connection to the K direct connection switch groups by using the K interconnection port groups, and there is only one different subnetwork identifier between the K subnetwork identifiers of the switch in the K direct connection switch groups and the K subnetwork identifiers of the switch. Therefore, it may be understood that if only one subnetwork identifier between two switches is different, the two switches are connected through an interconnection port of the K interconnection port groups, or in other words, there is a one-hop reachable path between the two switches. Each interconnection port includes a pair of ports (including an input port and an output port), and correspondingly, the K interconnection port groups include K input port groups and K output port groups.

Optionally, when K=3, the K interconnection port groups are three interconnection port groups. For ease of differentiation and description, the three interconnection port groups are respectively denoted as an inter-plane interconnection port group, an inter-group interconnection port group, and an intra-group interconnection port group. The inter-plane interconnection port group includes N−1 inter-plane interconnection ports, the inter-group interconnection port group includes N−1 inter-group interconnection ports, and the intra-group interconnection port group includes N−1 intra-group interconnection ports.

The N−1 inter-plane interconnection ports are configured to connect the first direct connection switch group, namely, the N−1 switches in the planar direct connection switch group, the N−1 inter-group interconnection ports are configured to connect the second direct connection switch group, namely, the N−1 switches in the inter-group direct connection switch group, and the N−1 intra-group interconnection ports are configured to connect the third direct connection switch group, namely, the N−1 switches in the intra-group direct connection switch group.

The switch (1, 1, 1) in FIG. 1 is used as an example. N−1 inter-plane interconnection ports of the switch (1, 1, 1) may be configured to connect N−1 switches with coordinates being from (2, 1, 1) to (N, 1, 1), N−1 inter-group interconnection ports of the switch (1, 1, 1) may be configured to connect N−1 switches with coordinates being from (1, 2, 1) to (1, N, 1), and N−1 intra-group interconnection ports of the switch (1, 1, 1) are configured to connect N−1 switches with coordinates being from (1, 1, 2) to (1, 1, N).

An interconnection between each switch and the K direct connection switch groups can be implemented by using the K interconnection port groups of each switch, and a direct interconnection or an indirect interconnection between every two switches in the DCN can be further implemented. That is, there is a one-hop or multiple-hop reachable transmission path between every two switches. Each switch corresponds to one direct connection switch group in the DCN to which the switch belongs, and in each level of subnetwork. Therefore, when traffic is forwarded from a source switch to a destination switch, a traffic forwarding path from the source switch to the destination switch may be designed based on an interconnection structure between switches in the DCN.

For example, K subnetwork identifiers of the source switch are $(S_1, S_2, \ldots, S_K)$, and K subnetwork identifiers of the destination switch are $(D_1, D_2, \ldots, D_K)$. $S_1$, $S_2, \ldots$, and $S_K$ respectively represent a first-level subnetwork, a second-level subnetwork, $\ldots$, and a $(K-1)^{th}$-level subnetwork to which the source switch belongs, and a number in the $(K-1)^{th}$-level subnetwork, and $D_1, D_2, \ldots$, and $D_K$ respectively represent a first-level subnetwork, a second-level subnetwork, $\ldots$, and a $(K-1)^{th}$-level subnetwork to which the destination switch belongs, and a number in the $(K-1)^{th}$-level subnetwork.

Case 1:

There is only one different subnetwork identifier between the K subnetwork identifiers of the source switch and the K subnetwork identifiers of the destination switch. That is, the destination switch is one of K direct connection switch groups of the source switch. In other words, there is a one-hop reachable transmission path between the source switch and the destination switch. Therefore, the source switch may forward target traffic to the destination switch over the one-hop reachable transmission path.

Case 2:

There are at least two different subnetwork identifiers between the K subnetwork identifiers of the source switch and the K subnetwork identifiers of the destination switch. In this case, one hop between the source switch and the destination switch is unreachable. Therefore, a shortest transmission path from the source switch to the destination switch, namely, a transmission path with a minimum hop count, needs to be determined.

A larger quantity of different subnetwork identifiers between the K subnetwork identifiers of the source switch and the K subnetwork identifiers of the destination switch indicates a larger hop count from the source switch to the destination switch. When the K subnetwork identifiers of the source switch are entirely different from the K subnetwork identifiers of the destination switch, that is, $S_1 \neq D_1$, $S_2 \neq$ $D_2, \ldots$, and $S_K \neq D_K$, there is a maximum hop count of traffic forwarding from the source switch to the destination switch, and there are at least K hops.

The following describes a route design method from the source switch to the destination switch by using a K-hop scenario as an example.

Step 1. A source switch $(S_1, S_2, \ldots, S_K)$ may forward target traffic to a first switch whose K−1 subnetwork identifiers are the same as K−1 subnetwork identifiers of the source switch $(S_1, S_2, \ldots, S_K)$ and whose one subnetwork identifier is the same as one subnetwork identifier of a destination switch, that is, one of the K subnetwork identifiers $(S_1, S_2, \ldots, S_K)$ is replaced with one subnetwork identifier of the destination switch, for example, $(S_1, S_2, \ldots, D_K)$, and the source switch $(S_1, S_2, \ldots, S_K)$ forwards the target traffic to the switch $(S_1, S_2, \ldots, D_K)$. There are K−1 identical subnetwork identifiers and one different subnetwork identifier between the first switch and the source switch. Therefore, the first switch is a switch that has a one-hop reachable path to the source switch, and the source switch may forward the target traffic to the first switch over the one-hop reachable path.

For example, when K=3, three subnetwork identifiers of the source switch are (1, 1, 1), and three subnetwork identifiers of the destination switch are (3, 2, 2). When the target traffic is forwarded from the source switch (1, 1, 1) to the destination switch (3, 2, 2), the target traffic may be first forwarded from the source switch (1, 1, 1) to a switch (1, 1, 2), two of three subnetwork identifiers of the switch (1, 1, 2) are the same as two subnetwork identifiers of the source switch, and the other subnetwork identifier is the same as a subnetwork identifier of the destination switch. Therefore, the source switch (1, 1, 1) is interconnected with the switch (1, 1, 2) through an intra-group interconnection port, and the source switch (1, 1, 1) may forward the target traffic to the switch (1, 1, 2) through the intra-group interconnection port.

Step 2. The first switch may replace one of K subnetwork identifiers of the first switch with one subnetwork identifier of the destination switch in a processing manner similar to that of the source switch. In this case, the replaced subnetwork identifier is a subnetwork identifier that was not replaced in step 1, or in other words, the replaced subnetwork identifier herein is a subnetwork identifier that is different from K subnetwork identifiers of the destination switch, for example, $(S_1, D_2, \ldots, D_K)$, and the target traffic is forwarded to the switch $(S_1, D_2, \ldots, D_K)$. In this manner, the target traffic is forwarded until the target traffic is forwarded to the destination switch, and traffic forwarding ends. Because one of the K subnetwork identifiers is replaced during each forwarding and the target traffic is forwarded to the switch, K hops are used to forward the target traffic to the destination switch.

Following the foregoing example, after receiving the target traffic sent by the source switch, the switch (1, 1, 2) may forward the target traffic to a switch (1, 2, 2), and the switch (1, 2, 2) is interconnected with the switch (1, 1, 2) through an inter-group interconnection port. Therefore, the switch (1, 1, 2) may forward the target traffic to the switch (1, 2, 2) through the inter-group interconnection port. Then, the switch (1, 2, 2) forwards the received target traffic to the switch (3, 2, 2), and the switch (3, 2, 2) is interconnected with the switch (1, 2, 2) through an inter-plane interconnection port. Therefore, the switch (1, 2, 2) may forward the target traffic to the destination switch (3, 2, 2) through the inter-plane interconnection port.

The foregoing description is an example but is not a limitation, a forwarding path from the source switch (1, 1, 1) to the destination switch (3, 2, 2) may also be (1, 1, 1)→(3, 1, 1)→(3, 2, 1)→(3, 2, 2), (1, 1, 1)→(3, 1, 1)→(3, 1, 2)→(3, 2, 2), (1, 1, 1)→(1, 2, 1)→(1, 2, 2)→(3, 2, 2), or the like. Provided that one of the K subnetwork identifiers is replaced with a subnetwork identifier of the destination switch during each forwarding and the target traffic is forwarded to the switch until all the K subnetwork identifiers of the switch are replaced with the K subnetwork identifiers of the destination switch, the traffic forwarding ends.

In general, a hop count from the source switch to the destination switch may be determined based on the K subnetwork identifiers of the source switch and the destination switch. For example, if there is one different subnetwork identifier between the source switch and the destination switch, only one hop may be used to forward the target traffic from the source switch to the destination switch. Alternatively, if there are M different subnetwork identifiers between the source switch and the destination switch, at least M hops are used to forward the target traffic from the source switch to the destination switch. A forwarding process may be as follows: The M different subnetwork identifiers are replaced with subnetwork identifiers of the destination switch in sequence, and after each replacement, the target traffic is forwarded to a switch corresponding to replaced K subnetwork identifiers, and this is denoted as one hop, until all the M different subnetwork identifiers are replaced with the subnetwork identifiers of the destination switch. At this point, the target traffic is forwarded to the destination switch, and the traffic forwarding ends.

Optionally, in this embodiment of this disclosure, the K interconnection port groups of the switch are connected to the K direct connection switch groups through K cyclic arrayed waveguide gratings (CAWGs).

Each CAWG includes N input optical fibers and N output optical fibers, the N−1 interconnection ports in each interconnection port group of the switch include N−1 input ports and N−1 output ports, the N−1 output ports in each interconnection port group of the switch are connected to an input optical fiber of a CAWG, and the N−1 input ports in the interconnection port group are connected to an output optical fiber of the CAWG.

An example in which an interconnection between a switch and an intra-group direct connection switch group is implemented through a CAWG is used. The switch may connect N−1 intra-group interconnection ports of the switch to a pair of optical fibers of the CAWG (including an input optical fiber and an output optical fiber), and the first switch in the intra-group direct connection switch group may also connect N−1 intra-group interconnection ports of the first switch to another pair of optical fibers of the CAWG, that is, both the switch and a switch in the intra-group direct connection switch group of the switch may be connected to a pair of optical fibers of the CAWG, so that the interconnection between the switch and the intra-group direct connection switch group can be implemented through the CAWG. The following describes in detail an implementation of an interconnection between a switch and a switch in each direct connection switch group with reference to FIG. 2 to FIG. 7.

It should be understood that, the example in which the interconnection between the switches is implemented through the CAWG is merely used for description in this embodiment of this disclosure, but should not constitute any limitation on this embodiment of this disclosure. In this embodiment of this disclosure, another optical connection manner such as a silicon photonic connection manner may also be used to replace the CAWG to implement the interconnection between the switch and the switch in each direct connection switch group.

Before that the interconnection between the switch and the switch in each direct connection switch group is implemented through the CAWG is described in detail, first, a structure of the CAWG is described with reference to FIG. 2.

Figure 2:
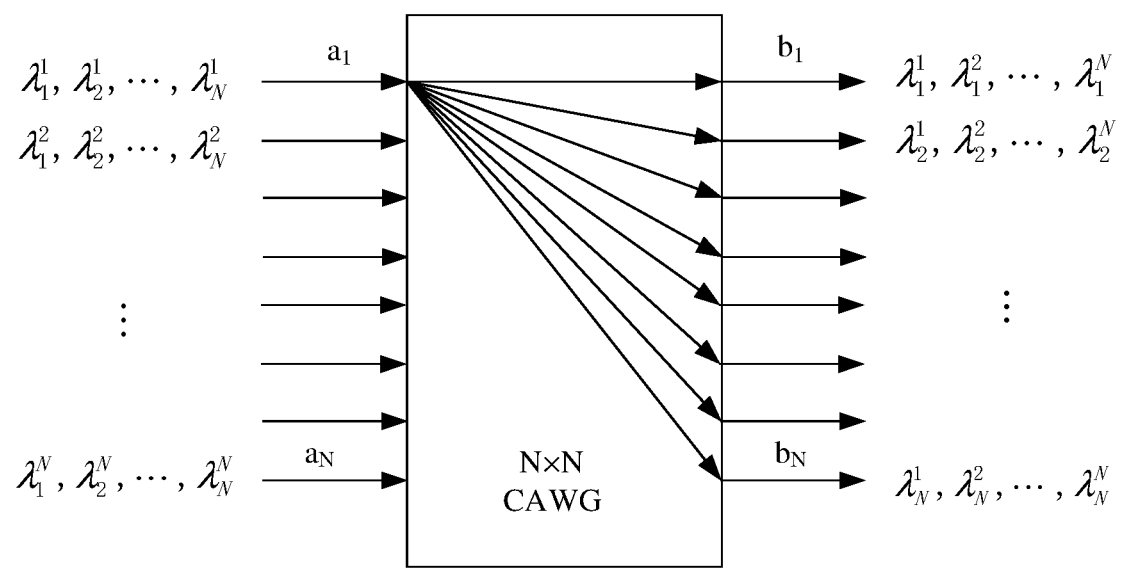
FIG. 2 is a schematic diagram of a working principle of a CAWG according to an embodiment of this disclosure.

As shown in FIG. 2, one N×N CAWG has N input ports ($a_1, a_2, \ldots, a_N$) and N output ports ($b_1, b_2, \ldots, b_N$), each input port is externally connected to one input optical fiber, each output port is externally connected to one output optical fiber, and each input optical fiber has input optical signals with N wavelengths. For example, an input optical fiber externally connected to an input port $a_1$ has input optical signals with N wavelengths that are respectively $\lambda_1^1$, $\lambda_2^1, \ldots, \lambda_N^1$. A superscript of $\lambda$ indicates an input port number corresponding to an optical signal, and a subscript of $\lambda$ indicates a number of a wavelength in the input port.

Optical signals with different wavelengths on each input optical fiber can be allocated to different output optical fibers based on a wavelength allocation characteristic of the CAWG, that is, output optical signals with N wavelengths are output from each output optical fiber. An output optical fiber externally connected to an output port $b_1$ has optical signals with N wavelengths that are respectively $\lambda_1^1$, $\lambda_1^2, \ldots, \lambda_1^N$. Herein, a subscript of $\lambda$ indicates an output port number corresponding to an optical signal, and a superscript of $\lambda$ indicates a number of a wavelength in the output port. Therefore, the CAWG can implement non-blocking exchange between optical signals of the N input optical fibers and optical signals of the N output optical fibers.

Based on the foregoing characteristic of the CAWG, if each input optical fiber of the CAWG is connected to a plurality of output ports of a switch, and each output optical fiber of the CAWG is connected to a plurality of input ports of a switch. In this way, a MESH connection between the switches connected through the input optical fiber and the output optical fiber of the CAWG may be implemented.

Figure 3:
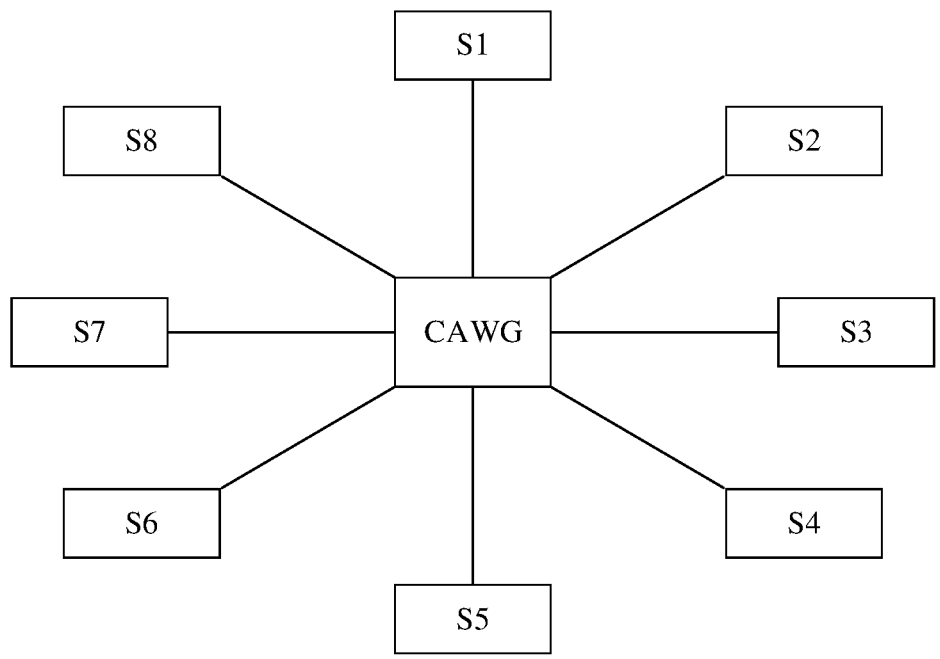
FIG. 3 is a physical connection diagram of implementing a switch interconnection through a CAWG.

FIG. 3 is a schematic diagram of a physical connection of implementing an interconnection between eight switches through an 8×8 CAWG.

In FIG. 3, S1 to S8 indicate the eight switches interconnected through the 8×8 CAWG, and a connection line between a switch and the CAWG indicates a pair of optical fibers (including an input optical fiber and an output optical fiber), or may be a bidirectional optical fiber. The input optical fiber of the CAWG is connected to an output port of the switch, and the output optical fiber is connected to an input port of the switch.

Therefore, eight input optical fibers and eight output optical fibers of the 8×8 CAWG are respectively connected to output ports and input ports of the eight switches, and a MESH connection of the input ports and the output ports of the eight switches can be implemented.

Figure 4:
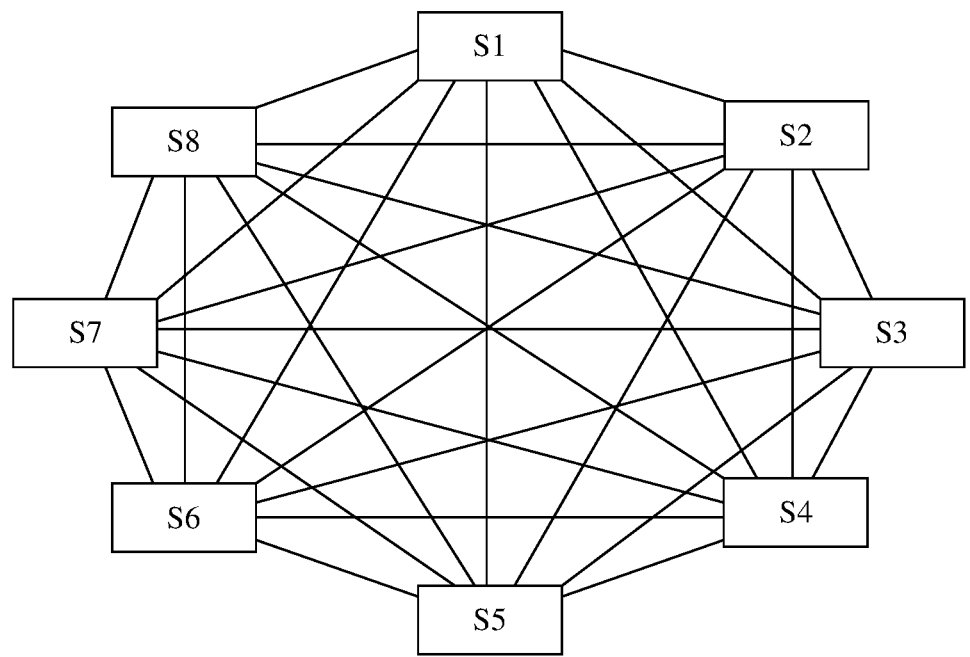
FIG. 4 is a logical connection diagram of implementing a switch interconnection through a CAWG.

The eight switches are physically a star structure shown in FIG. 3, and are logically a MESH structure shown in FIG. 4. Therefore, a full interconnection between the switches is implemented through the CAWG, to simplify a network structure.

In an existing solution, each pair of ports of the switch occupies a pair of optical fibers, but N pairs of ports of the switch may be multiplexed to a pair of optical fibers through the CAWG and be connected to a pair of optical fibers of the CAWG. Therefore, using the network architecture in this embodiment of this disclosure can reduce a quantity of optical fibers in the DCN to 1/N of a conventional solution, resolving a bottleneck of fiber deployment in the DCN and helping reduce optical fiber costs in comparison with relatively high costs of a multimode optical fiber.

In addition, a CAWG solution is used, when a port of the switch is expanded, it may be required to only connect a tail fiber to a multiplexer/demultiplexer. Therefore, there is no need to lay a pipeline fiber across an equipment room, facilitating network maintenance and capacity expansion. The following describes several connection solutions for implementing a connection between the switch and the CAWG with reference to FIG. 5 to FIG. 7.

It should be noted that the following several connection solutions are merely possible implementations used to implement the DCN in this embodiment of this disclosure, and should not constitute any limitation on this disclosure, and this embodiment of this disclosure should not be limited thereto.

Figure 5:
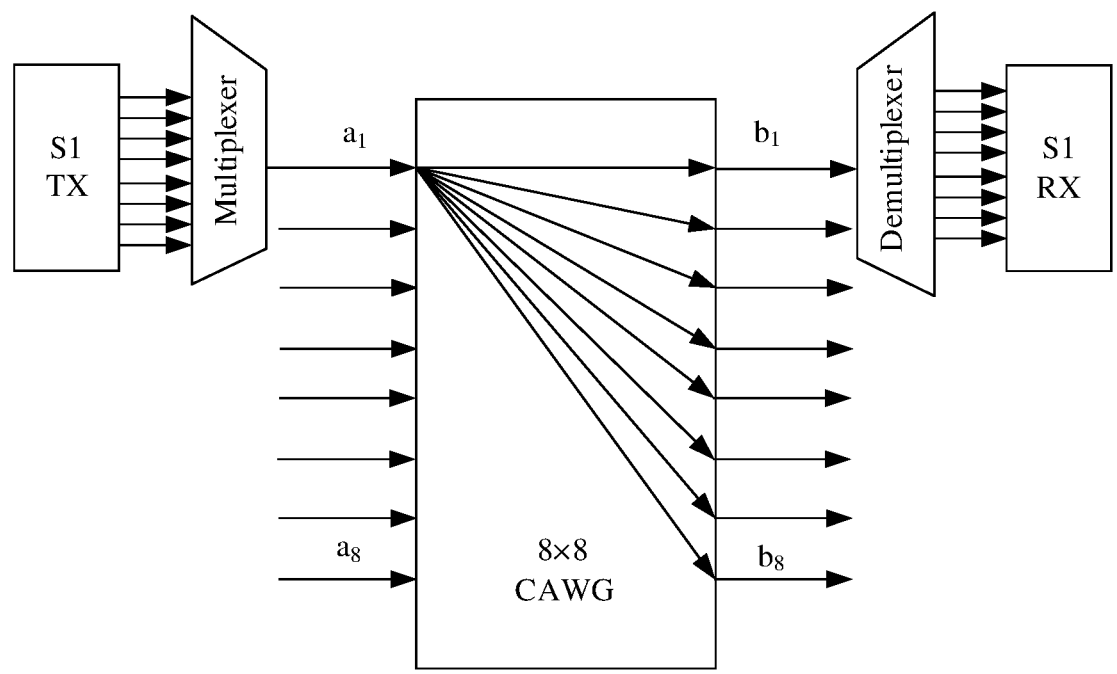
FIG. 5 is a schematic diagram of a connection solution between a switch and a CAWG according to an embodiment of this disclosure.

FIG. 5 is a schematic diagram of a connection solution between a switch and a CAWG according to an embodiment of this disclosure.

In a connection solution 1 shown in FIG. 5, an input/output port of a switch S1 is an independent colored optical interface. Each input/output port may input/output an optical signal with one wavelength.

At a transmit end (TX) of the switch S1, optical signals with eight wavelengths output from eight output ports are multiplexed to an optical fiber by using a multiplexer and then are connected to an input optical fiber of the CAWG.

At a receive end (RX) of the switch S1, an output optical fiber of the CAWG is connected to a demultiplexer, and the optical signals with eight wavelengths separated by the demultiplexer are separately input to eight input ports of the switch.

Similarly, another switch may use the connection solution 1. An output port of the switch is connected to an input optical fiber of the CAWG by using the multiplexer, and an output optical fiber of the CAWG is connected to an input port of the switch by using the demultiplexer. In this way, each switch is connected to a pair of input/output optical fibers of the CAWG in the foregoing connection manner, so that a full interconnection between eight switches can be implemented through an 8×8 CAWG, that is, a logical MESH connection is implemented through a physical star connection.

Figure 6:
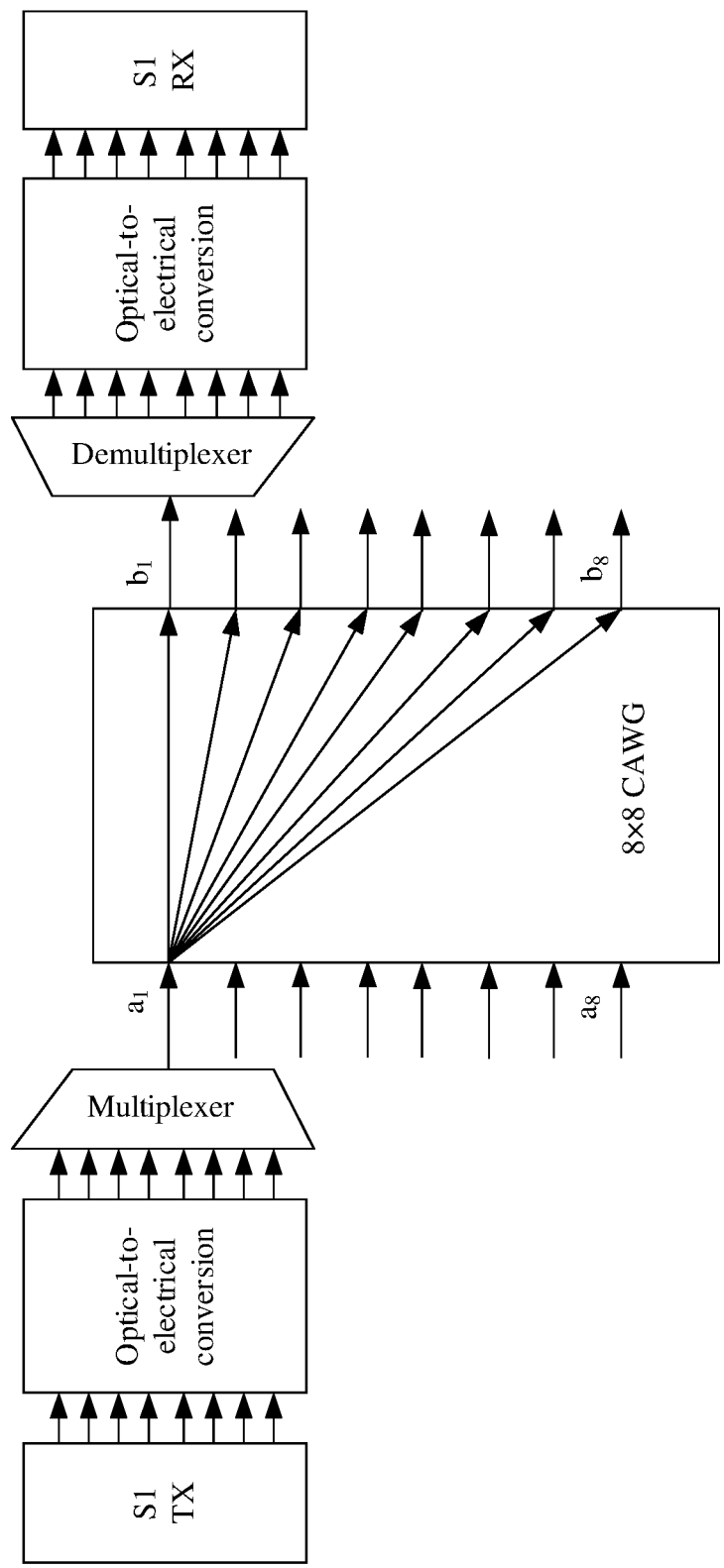
FIG. 6 is a schematic diagram of another connection solution between a switch and a CAWG according to an embodiment of this disclosure.

FIG. 6 is a schematic diagram of another connection solution between a switch and a CAWG according to an embodiment of this disclosure.

In a connection solution 2 shown in FIG. 6, an input/output port of the switch is an electrical interface or a white optical port, then, an optical-to-electrical converter needs to be externally connected to the input/output port of the switch, and converts, into an optical signal, an electrical signal output from the output port, or converts, into an electrical signal, an optical signal input to the input port of the switch. Therefore, an optical-to-electrical conversion step is added to the connection solution 2 relative to the connection solution 1.

At a TX of a switch S1, eight output ports on the switch S1 are converted into eight colored optical interfaces by using an optical-to-electrical converter, and optical signals output from the eight colored optical interfaces are multiplexed to an optical fiber by using a multiplexer and then are connected to an input optical fiber of the CAWG.

At an RX of the switch S1, an output optical fiber of the CAWG separates optical signals with eight wavelengths by using a demultiplexer, and then the optical signals with eight wavelengths are separately connected to eight input ports after optical-to-electrical conversion is performed by using the optical-to-electrical converter.

Similarly, another switch may use the connection solution 2. An output/input port of the switch is connected to a pair of input/output optical fibers of the CAWG, so that a full interconnection between eight switches can be implemented through an 8×8 CAWG, that is, a logical MESH connection is implemented through a physical star connection.

Figure 7:
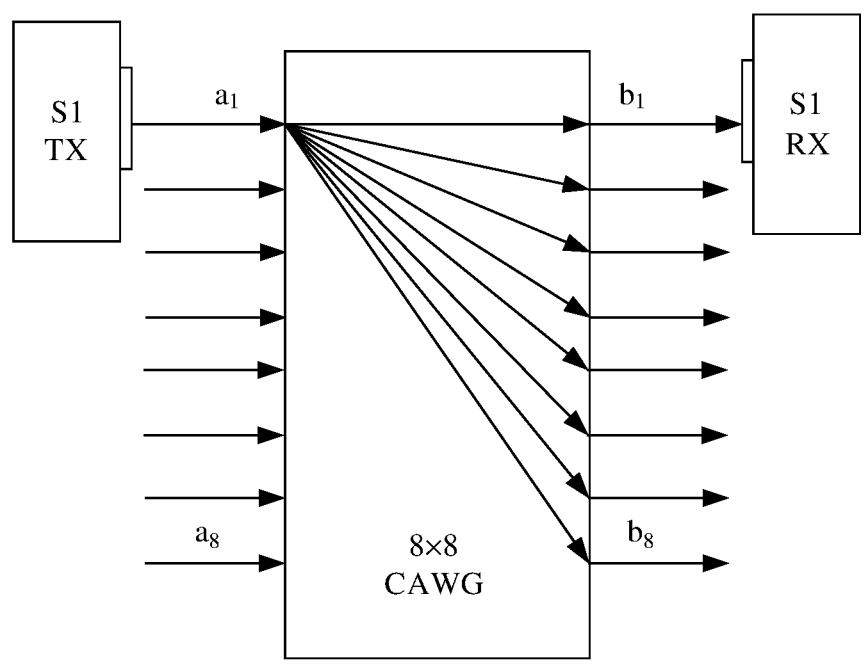
FIG. 7 is a schematic diagram of still another connection solution between a switch and a CAWG according to an embodiment of this disclosure.

FIG. 7 is a schematic diagram of still another connection solution between a switch and a CAWG according to an embodiment of this disclosure.

In a connection solution 3 shown in FIG. 7, a plurality of input/output ports of the switch are integrated into one colored optical integration interface by using a colored optical integration module.

Then, at a TX of a switch S1, optical signals with eight wavelengths may be multiplexed to an optical fiber by using the colored optical integration interface, so that an output port of the colored optical integration interface of the switch may be directly connected to an input optical fiber of the CAWG. At an RX of the switch S1, an output optical fiber of the CAWG is connected to an input port of the colored optical integration interface.

In general, each switch in a DCN may be interconnected with N−1 switches by using N−1 colored optical interfaces, and the N−1 colored optical interfaces may be independent colored optical interfaces (as shown in FIG. 5), or a colored optical integration interface (as shown in FIG. 7), or an electrical interface/a white optical port and an optical-to-electrical converter (as shown in FIG. 6). An input port of each colored optical interface is connected to the input optical fiber of the CAWG, and an output port is connected to the output optical fiber of the CAWG.

Therefore, a conventional three-layer networking structure may be simplified to one-layer physical networking in the DCN implemented through the CAWG. An interconnection between the switch and a group of switches in each level of subnetwork can be implemented only by needing the CAWG. Because a layer of network transfer is reduced, a device switching capacity and a port quantity that are required for an entire network are reduced by ½, and this is equivalent to saving half of device and port costs.

Optionally, each switch in the DCN includes K interconnection port groups, a processor, a switching chip, and at least one access port.

Figure 8:
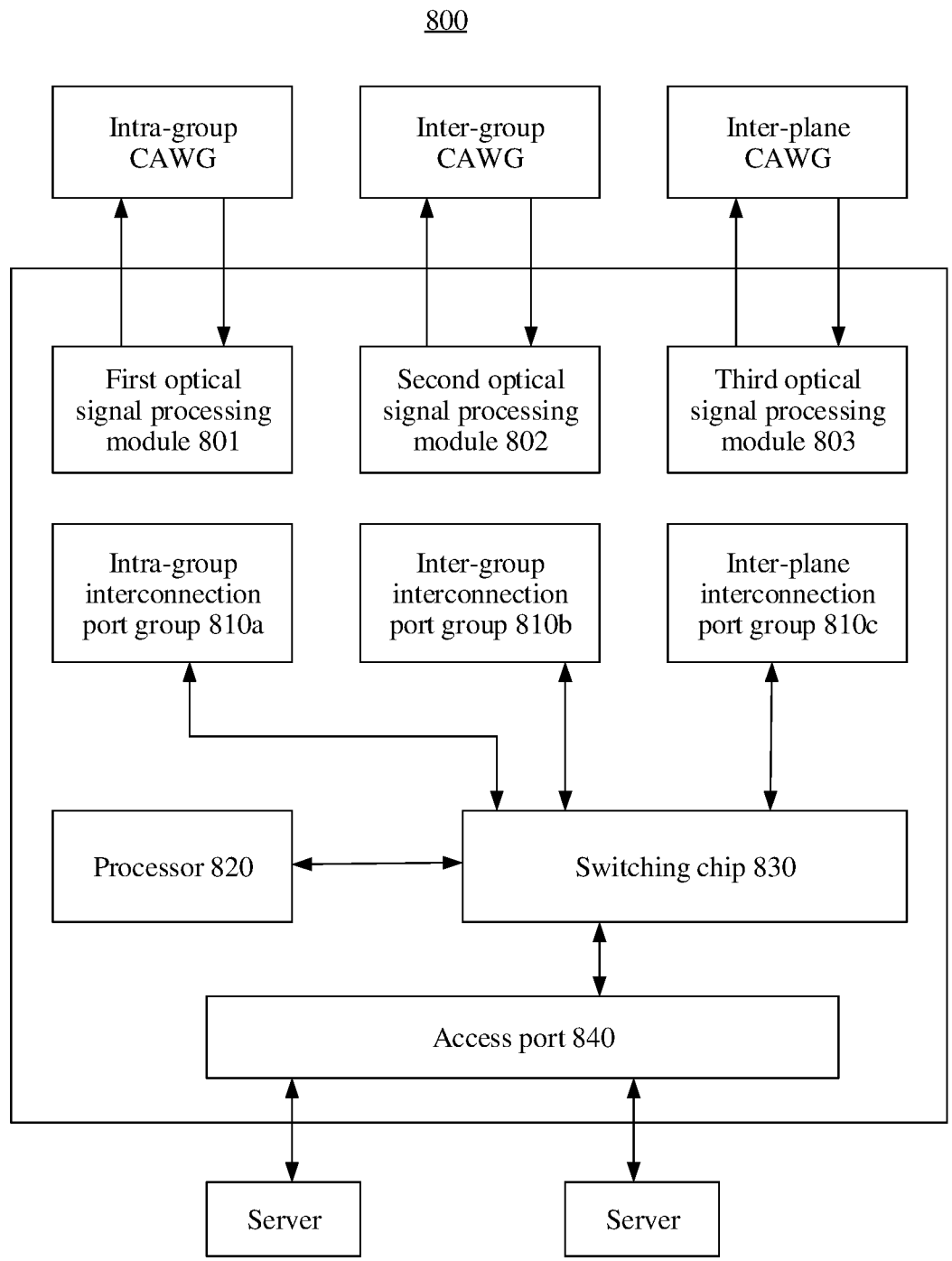
FIG. 8 is a schematic structural diagram of a switch according to an embodiment of this disclosure.

FIG. 8 specifically shows a switch 800 provided in an embodiment of this disclosure by using K=3 as an example. As shown in FIG. 8, the switch 800 includes K interconnection port groups 810 (which specifically includes three interconnection port groups in FIG. 8, namely, an intra-group interconnection port group 810a, an inter-group interconnection port group 810b, and an inter-plane interconnection port group 810c), a processor 820, a switching chip 830, and an access port 840.

The K interconnection port groups 810 are configured to connect K direct connection switch groups of the switch.

Specifically, each interconnection port group includes N−1 interconnection ports, configured to respectively connect N−1 switches in a direct connection switch group corresponding to the interconnection port group.

The access port 840 is configured to connect a server.

The switching chip 830 is configured to: obtain, through the access port 840, target traffic sent by the server, determine a target transmission path from the switch to a destination switch based on a pre-stored transmission path set, and send the target traffic to the destination switch over the target transmission path. The destination switch is any switch except the switch in a DCN in which the switch is located. The pre-stored transmission path set includes a transmission path between any two switches in the data center network DCN in which the switch is located, the transmission path between every two switches includes a plurality of transmission paths, the DCN is a K-level network, the switch has K subnetwork identifiers, the K subnetwork identifiers are respectively used to indicate each level of subnetwork to which the switch belongs and a number of the switch in a $(K-1)^{th}$-level subnetwork to which the switch belongs, an $i^{th}$-level subnetwork identifier of N−1 switches included in an $i^{th}$ direct connection switch group of the K direct connection switch groups is different from an $i^{th}$-level subnetwork identifier of the switch, and is the same as other K−1 subnetwork identifiers of the switch, N and K are integers, N≥2, K≥2, and i=1, . . . , and K.

The processor 820 is configured to: generate the target transmission path from the switch to the destination switch; and add the target transmission path to the transmission path set.

When generating the target transmission path from the source switch to the destination switch, the processor 820 is configured to: determine a first path set, where the first path set includes a one-hop reachable transmission path between switches in the DCN; determine a first switch set and a second switch set, where the first switch set includes the source switch and all direct connection switches of the source switch, and the second switch set includes the destination switch and all direct connection switches of the destination switch; determine a second path set from a switch in the first switch set to a switch in the second switch set based on the first path set; and determine the target transmission path from the source switch to the destination switch based on the first path set and the second path set, where the target transmission path includes a plurality of transmission paths from the source switch to the destination switch.

When determining the target transmission path from the source switch to the destination switch based on the first path set and the second path set, the processor 820 is configured to: determine a first transmission path group in the second path set, where the first transmission path group includes N transmission paths with a minimum hop count from the source switch and a first direct connection switch group interconnected with the source switch to the destination switch and a second direct connection switch group interconnected with the destination switch, the first direct connection switch group is any direct connection switch group interconnected with the source switch, and the second direct connection switch group is any direct connection switch group interconnected with the destination switch; determine, in the first path set, a second transmission path group from the source switch to the first direct connection switch group, and a third transmission path group from the second direct connection switch group to the destination switch, where the second transmission path group includes N−1 transmission paths from the source switch to the first direct connection switch group, and the third transmission path group includes N−1 transmission paths from the second direct connection switch group to the destination switch; and determine the target transmission path from the source switch to the destination switch based on the second transmission path group, the first transmission path group, and the third transmission path group.

When sending the target traffic to the destination switch over the target transmission path, the switching chip 830 is configured to: perform traffic balancing on the target traffic to obtain N pieces of sub-traffic; separately send N−1 pieces of sub-traffic in the N pieces of sub-traffic to N−1 direct connection switches in the first direct connection switch group over the N−1 transmission paths in the second transmission path group; and send, to another direct connection switch of the switch, sub-traffic forwarded by the switch, where the another direct connection switch does not belong to the first direct connection switch group.

Optionally, in this embodiment of this disclosure, when K is 3, a first-level subnetwork of the DCN is a plane, a second-level subnetwork is a group, an identifier of the first-level subnetwork is a plane identifier, an identifier of the second-level subnetwork is a group identifier, and an identifier of a third-level subnetwork is an intra-group identifier; and a first direct connection switch group in the K direct connection switch groups is a planar direct connection switch group and includes N−1 switches whose plane identifier is different from a plane identifier of the switch and whose group identifier and intra-group identifier are the same as a group identifier and an intra-group identifier of the switch, a second direct connection switch group is an inter-group direct connection switch group and includes N−1 switches whose group identifier is different from the group identifier of the switch and whose plane identifier and intra-group identifier are the same as the plane identifier and the intra-group identifier of the switch, and a third direct connection switch group is an intra-group direct connection switch group and includes N−1 switches whose intra-group identifier is different from the intra-group identifier of the switch and whose plane identifier and group identifier are the same as the plane identifier and the group identifier of the switch.

In an optional implementation, the switch may further include a first optical signal processing module 801, a second optical signal processing module 802, and a third optical signal processing module 803.

The first optical signal processing module 801 is connected to a transceiver end of an intra-group CAWG, the second optical signal processing module 802 is connected to a transceiver end of an inter-group CAWG, and the third optical signal processing module 803 is connected to a transceiver end of an inter-plane CAWG.

As mentioned above, the intra-group CAWG may be configured to implement an interconnection between switches having the same plane identifier and group identifier but different intra-group identifiers, the inter-group CAWG may be configured to implement an interconnection between switches having the same plane identifier and intra-group identifier but different group identifiers, and the inter-plane CAWG may be configured to implement an interconnection between switches having the same group identifier and intra-group identifier but different plane identifiers.

Specifically, the first optical signal processing module 801 is configured to: perform multiplexing processing on an optical signal output from an intra-group interconnection port 811 of the switch, and input, to an input port of the CAWG through an input optical fiber of the intra-group CAWG, an optical signal obtained after the multiplexing processing. The first optical signal processing module 801 is further configured to: perform demultiplexing processing on the optical signal output from an output optical fiber of the intra-group CAWG, and input, to the intra-group interconnection port 811 of the switch, an optical signal obtained after the demultiplexing processing.

Similarly, the second optical signal processing module 802 may perform similar processing on an optical signal that is input to the inter-group CAWG and an optical signal that is output from the inter-group CAWG, and this is also the same for the third optical signal processing module 803. Details are not described herein again.

When an input/output port of the switch 800 is an electrical interface or a white optical port, the first optical signal processing module 801, the second optical signal processing module 802, and the third optical signal processing module 803 may be further configured to: convert, into an optical signal, an electrical signal output from the output port of the switch, or convert, into an electrical signal, an optical signal input from the input port. For a specific implementation process, refer to related descriptions in the embodiment shown in FIG. 6. Details are not described herein again. In this embodiment of this disclosure, a DCN formed by a switch with the foregoing structure may be considered as a huge data exchange device, each switch in a network architecture may be considered as an interface board of the data exchange device, and the foregoing interconnection method may be used between interface boards. Therefore, the data exchange device does not have an independent interface board and control board, and all exchange functions and control functions are distributed in each interface board, namely, the switch. Traffic may be forwarded by using a traffic forwarding method described below.

Figure 9A:
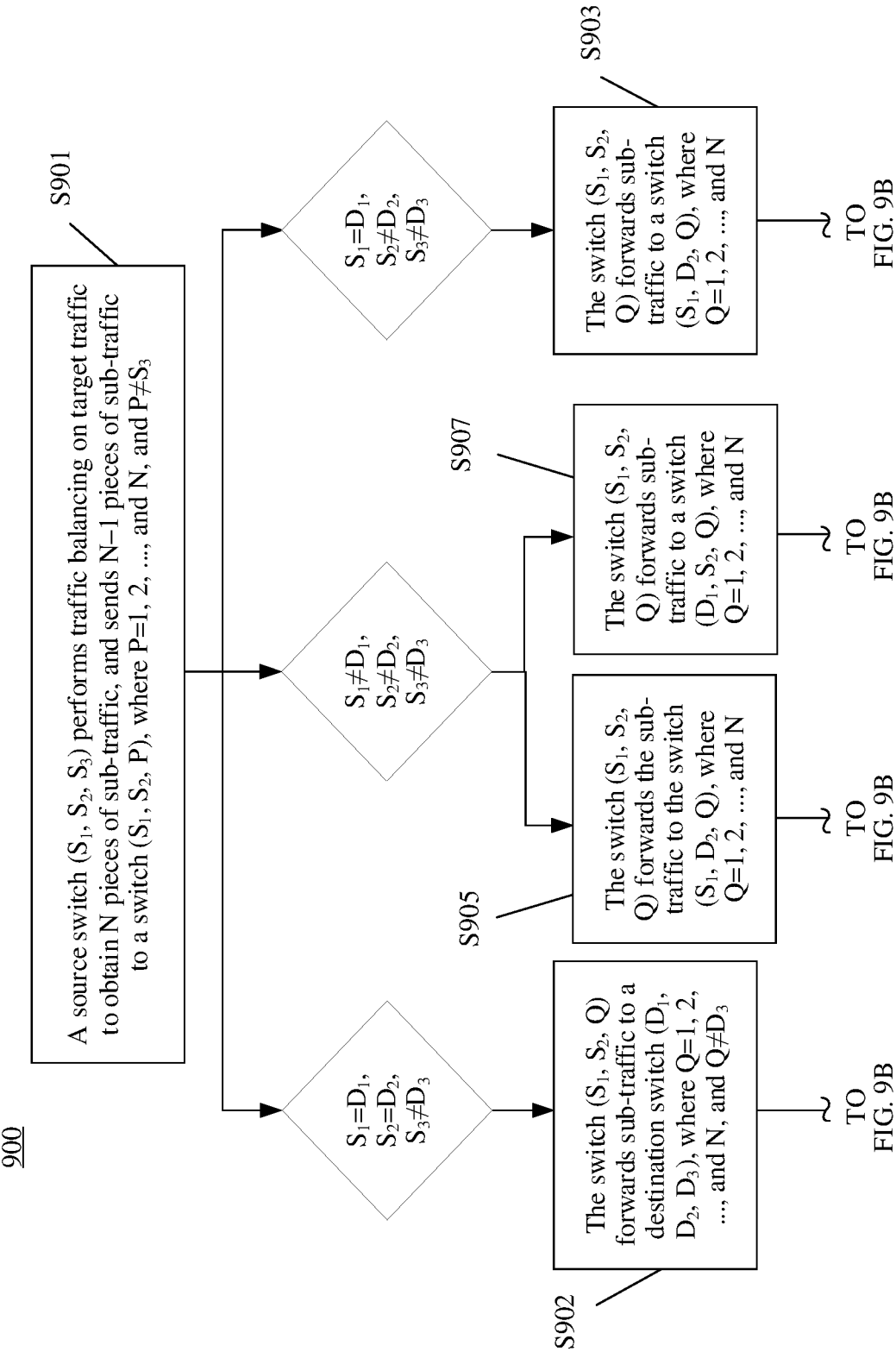
FIG. 9A and FIG. 9B are a schematic flowchart of a traffic transmission method in a DCN according to an embodiment of this disclosure.
Figure 9B:
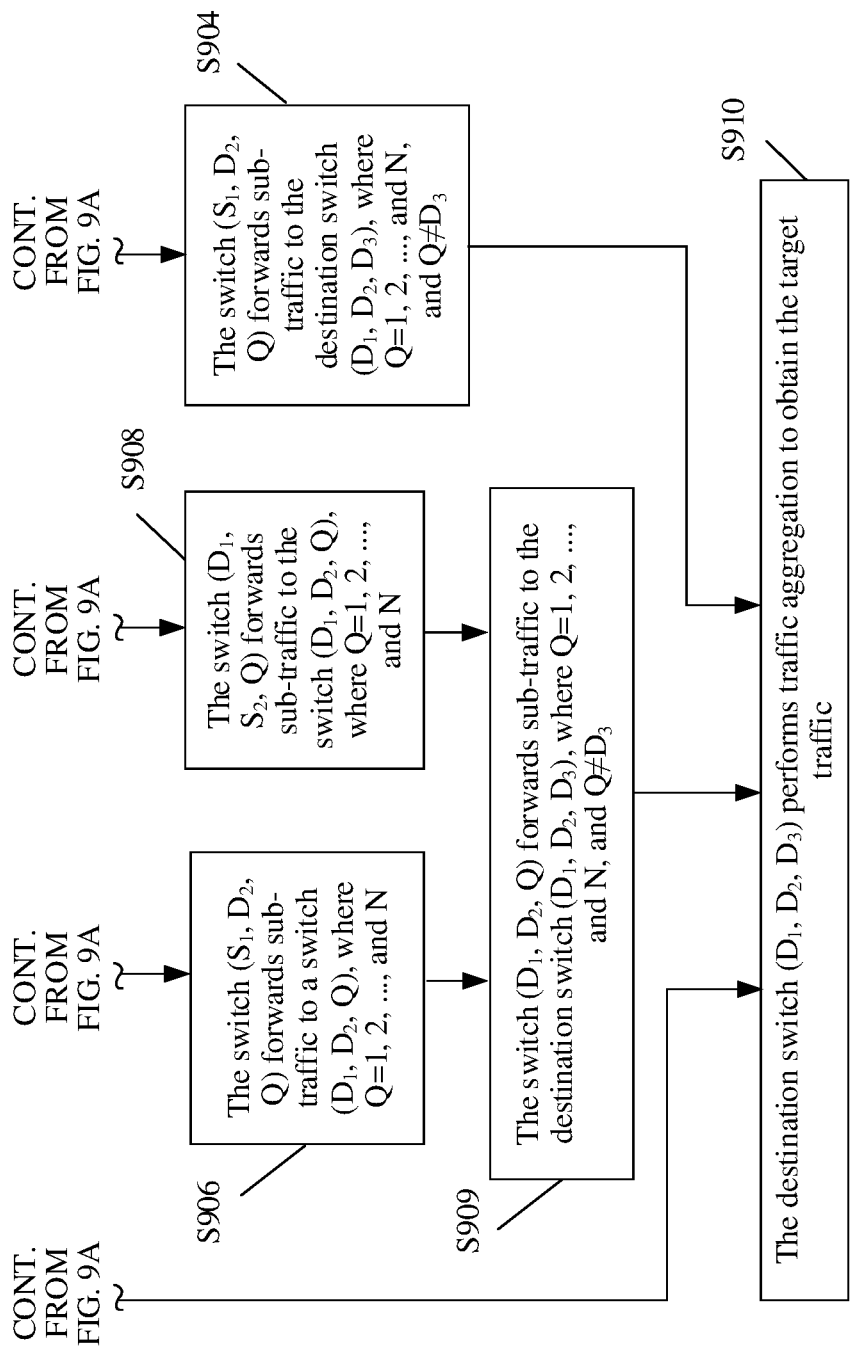

FIG. 9A and FIG. 9B are a schematic flowchart of a traffic transmission method 900 in a DCN by using K=3 as an example according to an embodiment of this disclosure.

As shown in FIG. 9A and FIG. 9B, the method 900 may include the following steps.

S901. A source switch ($S_1$, $S_2$, $S_3$) performs traffic balancing on target traffic to obtain N pieces of sub-traffic, and the source switch ($S_1$, $S_2$, $S_3$) separately sends N−1 pieces of sub-traffic in the N pieces of sub-traffic to N−1 intra-group direct connection switches of the source switch.

The source switch ($S_1$, $S_2$, $S_3$) separately forwards the N−1 pieces of sub-traffic to a switch ($S_1$, $S_2$, P) whose plane identifier and group identifier are the same as a plane identifier and a group identifier of the source switch and whose intra-group identifier is different from an intra-group identifier of the source switch, where P=1, 2, . . . , and N, and P≠$S_3$.

Herein, a method for performing the traffic balancing by the source switch may be a traffic balancing method. For example, balancing is performed based on a quantity of data packets, or balancing is performed based on a quantity of 5-tuple flows of a data packet. This is not limited in this embodiment of this disclosure.

In this embodiment of this disclosure, the source switch divides target traffic into the N pieces of sub-traffic for traffic forwarding, and this can improve port utilization of a device and in addition can improve a traffic peak value between switches.

The source switch leaves one of the N pieces of sub-traffic to the source switch and sends the other N−1 pieces of sub-traffic to the N−1 intra-group direct connection switches of the source switch, so that each switch in a group in which the source switch is located obtains one piece of sub-traffic.

Case 1:

There is only one different subnetwork identifier between three subnetwork identifiers of a destination switch ($D_1$, $D_2$, $D_3$) and three subnetwork identifiers of the source switch ($S_1$, $S_2$, $S_3$), for example, $S_1$=$D_1$, $S_2$=$D_2$, and $S_3$≠$D_3$, and a procedure proceeds to S902.

In this embodiment, the source switch and the destination switch are in a same plane and in a same group.

In S902, because the source switch and the destination switch are in a same group, another switch except the destination switch in the group to which the source switch belongs may send an obtained piece of sub-traffic to the destination switch.

A switch $(S_1, S_2, Q)$ separately forwards sub-traffic to a destination switch $(D_1, D_2, D_3)$, where $Q=1, 2, \ldots,$ and N, and $Q \neq D_3$, and the switch $(S_1, S_2, Q)$ is N−1 switches except the destination switch in the group to which the source switch belongs.

For example, if the source switch is (1, 1, 1) and the destination switch is (1, 1, N), in S901, the source switch may separately send the N−1 pieces of sub-traffic to the N−1 switches: switches (1, 1, 2) to (1, 1, N), so that each of switches (1, 1, 1) to (1, 1, N) obtains one piece of sub-traffic.

In S902, switches (1, 1, 1) to (1, 1, N−1) forward the obtained pieces of sub-traffic to the destination switch (1, 1, N), so that the destination switch (1, 1, N) receives the N−1 pieces of sub-traffic plus one piece of sub-traffic that the destination switch (1, 1, N) obtains in S901, the destination switch obtains the N pieces of sub-traffic, and then in S910, the destination switch aggregates the N pieces of sub-traffic to obtain the target traffic.

Case 2:

There are two different subnetwork identifiers between three subnetwork identifiers of a destination switch $(D_1, D_2, D_3)$ and three subnetwork identifiers of the source switch $(S_1, S_2, S_3)$, for example, $S_1 = D_1, S_2 \neq D_2,$ and $S_3 \neq D_3,$ and the procedure proceeds to S903.

In this embodiment, the source switch and the destination switch are in a same plane but in different groups.

In S903, the switch $(S_1, S_2, Q)$ forwards sub-traffic to a switch $(S_1, D_2, Q)$, where $Q=1, 2, \ldots,$ and N.

The switch $(S_1, S_2, Q)$ in a group to which the source switch belongs sends the obtained piece of sub-traffic to the switch $(S_1, D_2, Q)$ whose plane identifier is the same as a plane identifier of the source switch, whose group identifier is the same as a group identifier of the destination switch, and whose intra-group identifier is the same as an intra-group identifier of the switch $(S_1, S_2, Q)$.

In other words, the switch $(S_1, S_2, Q)$ in the group to which the source switch belongs may send the obtained piece of sub-traffic to an inter-group direct connection switch of the switch $(S_1, S_2, Q)$ in a same group as the destination switch, namely, the switch $(S_1, D_2, Q)$.

For example, the source switch is (1, 1, 1) and the destination switch is (1, 2, N). In S901, the source switch may separately send the N−1 pieces of sub-traffic to the N−1 switches: switches (1, 1, 2) to (1, 1, N), so that each of switches (1, 1, 1) to (1, 1, N) obtains one piece of sub-traffic. In S903, the switches (1, 1, 1) to (1, 1, N) separately forwards the obtained piece of sub-traffic to switches (1, 2, 1) to (1, 2, N), so that each switch in the group to which the destination switch belongs obtains one piece of sub-traffic.

In S904, N−1 switches except the destination switch in a group to which the destination switch belongs forward obtained pieces of sub-traffic to the destination switch.

Switches (1, 2, 1) to (1, 2, N−1) send the obtained pieces of sub-traffic to the destination switch (1, 2, N), so that the destination switch obtains the N pieces of sub-traffic, and then in S910, the destination switch aggregates the N pieces of sub-traffic to obtain the target traffic.

Case 3:

Three subnetwork identifiers of the destination switch $(D_1, D_2, D_3)$ are different from three subnetwork identifiers of the source switch $(S_1, S_2, S_3)$, and the procedure proceeds to S905 or S907. S905, S906, and S909 are denoted as a method 1, and S907, S908, and S909 are denoted as a method 2.

Method 1:

In S905, the switch $(S_1, S_2, Q)$ forwards sub-traffic to a switch $(S_1, D_2, Q)$, where $Q=1, 2, \ldots,$ and N.

The switch $(S_1, S_2, Q)$ in a group to which the source switch belongs forwards the obtained piece of sub-traffic to the correspondingly numbered switch $(S_1, D_2, Q)$ whose plane identifier is the same as the plane identifier of the source switch and whose group identifier is the same as the group identifier of the destination switch.

In other words, the switch $(S_1, S_2, Q)$ forwards the received piece of sub-traffic to an inter-group direct connection switch of the switch $(S_1, S_2, Q)$ in a plane in which the source switch is located, namely, the switch $(S_1, D_2, Q)$.

In S906, the switch $(S_1, D_2, Q)$ forwards the sub-traffic to a switch $(D_1, D_2, Q)$, where $Q=1, 2, \ldots,$ and N.

The switch $(S_1, D_2, Q)$ sends the received piece of sub-traffic to the switch $(D_1, D_2, Q)$ whose plane identifier and group identifier are the same as a plane identifier and the group identifier of the destination switch and whose intra-group identifier is the same as an intra-group identifier of the switch $(S_1, D_2, Q)$.

In other words, the switch $(S_1, D_2, Q)$ forwards the received piece of sub-traffic to a planar direct connection switch of the switch $(S_1, D_2, Q)$ in a plane in which the destination switch is located, namely, the switch $(D_1, D_2, Q)$.

In this case, the switch $(D_1, D_2, Q)$ that obtains the piece of sub-traffic is a switch in a group to which the destination switch belongs, and then in S909, N−1 switches except the destination switch in the group to which the destination switch belongs forward the obtained pieces of sub-traffic to the destination switch, so that the destination switch obtains the N pieces of sub-traffic, and then in S910, the destination switch aggregates the N pieces of sub-traffic to obtain the target traffic.

Method 2:

In S907, the switch $(S_1, S_2, Q)$ forwards sub-traffic to a switch $(D_1, S_2, Q)$, where $Q=1, 2, \ldots,$ and N.

The switch $(S_1, S_2, Q)$ in the group to which the source switch belongs sends the obtained piece of sub-traffic to the switch $(D_1, S_2, Q)$ whose plane identifier is the same as the plane identifier of the destination switch, whose group identifier is the same as the group identifier of the source switch, and whose intra-group identifier is the same as the intra-group identifier of the switch $(S_1, S_2, Q)$.

In other words, the switch $(S_1, S_2, Q)$ forwards the received piece of sub-traffic to a planar direct connection switch of the switch $(S_1, S_2, Q)$ in the plane in which the destination switch is located, namely, the switch $(D_1, S_2, Q)$.

In S908, the switch $(D_1, S_2, Q)$ forwards one piece of sub-traffic to a switch $(D_1, D_2, Q)$, where $Q=1, 2, \ldots,$ and N.

The switch $(D_1, S_2, Q)$ forwards the received piece of sub-traffic to an inter-group direct connection switch of the switch $(S_1, S_2, Q)$ in the plane in which the destination switch is located, namely, the switch $(D_1, D_2, Q)$.

In other words, the switch $(D_1, S_2, Q)$ forwards the obtained piece of sub-traffic to the switch $(D_1, D_2, Q)$ whose plane identifier and group identifier are the same as the plane identifier and the group identifier of the destination switch and whose intra-group identifier is the same as an intra-group identifier of the switch $(D_1, S_2, Q)$.

In this case, the switch that obtains the piece of traffic is a switch in the group to which the destination switch belongs, and then in S909, the switches except the destination switch in the group to which the destination switch belongs forward the obtained pieces of sub-traffic to the destination switch, so that the destination switch obtains the N pieces of sub-traffic, and then in S910, the destination switch aggregates the N pieces of sub-traffic to obtain the target traffic.

In general, a difference between the method 1 and the method 2 is that the method 1 is to first perform inter-group traffic forwarding on sub-traffic and then perform inter-plane traffic forwarding whereas the method 2 is to first perform the inter-plane traffic forwarding on the sub-traffic and then perform the inter-group traffic forwarding.

It should be understood that, the case 1 may further include $S_1=D_1$, $S_2 \neq D_2$, and $S_3=D_3$, and $S_1 \neq D_1$, $S_2=D_2$, and $S_3=D_3$. The case 2 may further include $S_1 \neq D_1$, $S_2 \neq D_2$, and $S_3=D_3$, and $S_1 \neq D_1$, $S_2=D_2$, and $S_3 \neq D_3$. One of the scenarios is merely used as an example in FIG. 9A and FIG. 9B, and in another scenario, traffic forwarding may be performed in a similar manner. Details are not described herein again.

It should be noted that when K>3, a traffic transmission method is similar to the traffic transmission method exemplified in the method 900. For example, when there are at least four different subnetwork identifiers between the source switch and the destination switch, the target traffic needs to be forwarded through a few more hops only in the manner described in S905 to S908. Details are not described herein.

Figure 10:
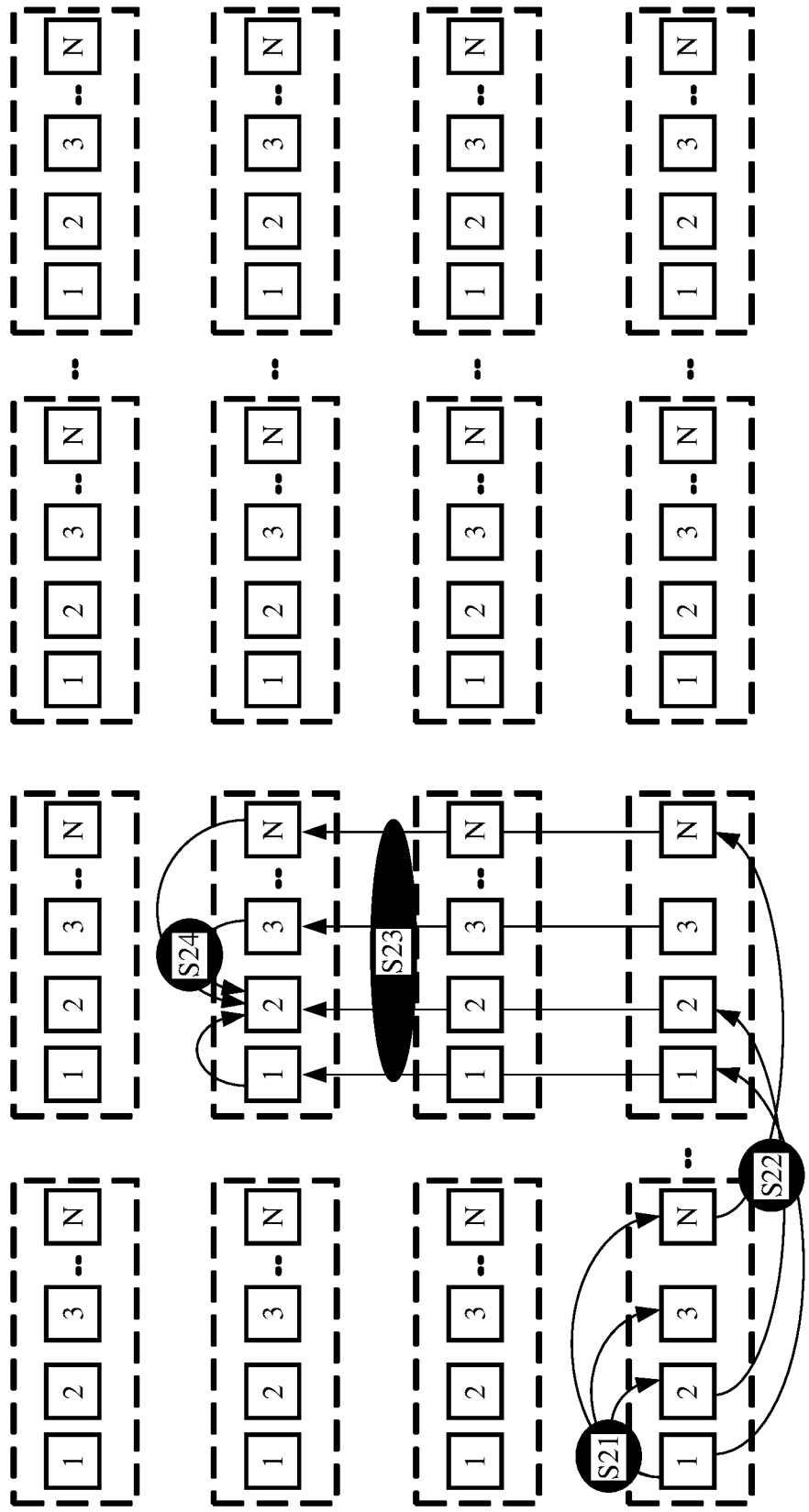
FIG. 10 is a schematic diagram of an example of a traffic transmission method in a DCN according to an embodiment of this disclosure.
Figure 11:
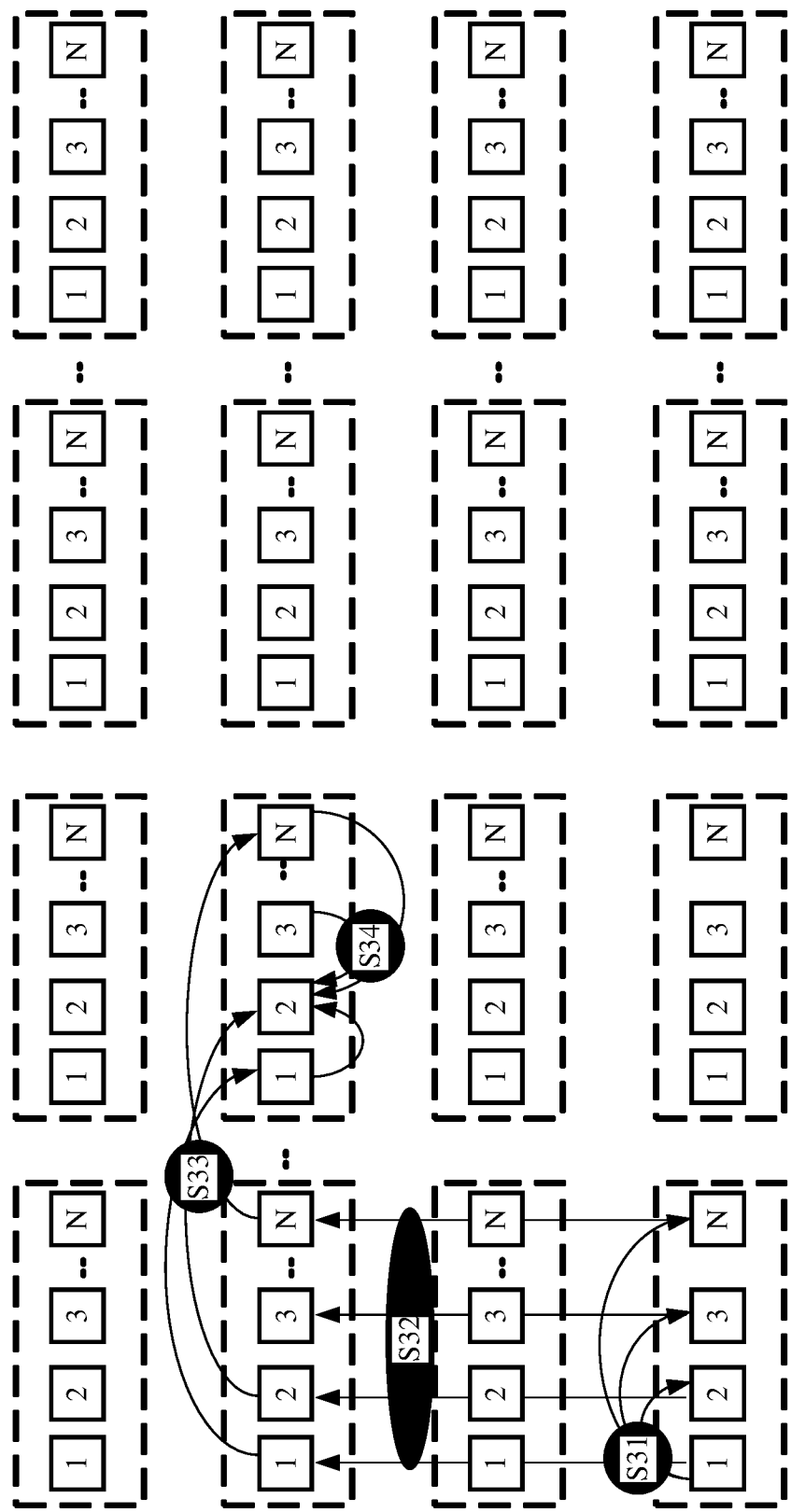
FIG. 11 is a schematic diagram of another example of a traffic transmission method in a DCN according to an embodiment of this disclosure.

The following describes an execution process of S901 to S910 with reference to specific examples shown in FIG. 10 and FIG. 11.

In the examples shown in FIG. 10 and FIG. 11, the source switch is (1, 1, 1) and the destination switch is (3, 2, 2), that is, the three subnetwork identifiers of the source switch are different from the three subnetwork identifiers of the destination switch. Therefore, a traffic forwarding process may include S901, S905, S906, S909, and S910, or S901, S907, S908, S909, and S910.

FIG. 10 illustrates a specific execution process of S901, S905, S906, S909, and S910.

In FIG. 10, an execution process of S21 corresponds to S901 in the method 900.

The source switch separately sends, to the switches (1, 1, 2) to (1, 1, N), the N−1 pieces of sub-traffic in the N pieces of sub-traffic obtained after the traffic balancing is performed on the target traffic, so that each of the switches (1, 1, 1) to (1, 1, N) obtains one piece of sub-traffic.

The switches (1, 1, 2) to (1, 1, N) are intra-group direct connection switches that are connected to the source switch (1, 1, 1) through an intra-group interconnection port. Therefore, the source switch (1, 1, 1) may forward the N−1 pieces of sub-traffic to the switches (1, 1, 2) to (1, 1, N) through the intra-group interconnection port.

An execution process of S22 corresponds to S905 in the method 900.

In S22, the switches (1, 1, 1) to (1, 1, N) that obtain pieces of sub-traffic separately send the obtained pieces of sub-traffic to the switches (1, 2, 1) to (1, 2, N).

Specifically, the switch (1, 1, 1) forwards the obtained piece of sub-traffic to the switch (1, 2, 1), the switch (1, 1, 2) forwards the obtained piece of sub-traffic to a switch (1, 2, 2), and so on. In S22, the switches perform the inter-group traffic forwarding, and the N pieces of sub-traffic are forwarded to N switches whose plane identifier is the same as the plane identifier of the source switch and whose group identifier is the same as the group identifier of the destination switch.

The switch (1, 1, 1) and the switch (1, 2, 1), the switch (1, 1, 2) and the switch (1, 2, 2), . . . , and the switch (1, 1, N) and the switch (1, 2, N) are switches interconnected through an inter-group interconnection port. Therefore, the switches (1, 1, 1) to (1, 1, N) may forward the obtained pieces of sub-traffic to corresponding switches in the switches (1, 2, 1) to (1, 2, N) through respective inter-group interconnection ports.

An execution process of S23 corresponds to S906 in the method 900.

In S23, the switches (1, 2, 1) to (1, 2, N) separately forward the obtained pieces of sub-traffic to switches (3, 2, 1) to (3, 2, N).

Specifically, the switch (1, 2, 1) forwards the obtained piece of sub-traffic to the switch (3, 2, 1), the switch (1, 2, 2) forwards the obtained piece of sub-traffic to the switch (3, 2, 2), and so on. In S23, the switches perform the inter-plane traffic forwarding, and the N pieces of sub-traffic are forwarded to a group of switches whose plane identifier and group identifier are the same as the plane identifier and the group identifier of the destination switch.

The switch (1, 2, 1) and the switch (3, 2, 1), the switch (1, 2, 2) and the switch (3, 2, 2), . . . , and the switch (1, 2, N) and the switch (3, 2, N) are switches interconnected through an inter-plane interconnection port. Therefore, the switches (1, 2, 1) to (1, 2, N) may forward the obtained pieces of sub-traffic to corresponding switches in the switches (3, 2, 1) to (3, 2, N) through respective inter-plane interconnection ports.

An execution process of S24 corresponds to S909 in the method 900.

In S24, the pieces of sub-traffic obtained by N−1 switches except the destination switch (3, 2, 2) in the switches (3, 2, 1) to (3, 2, N) are forwarded to the switch (3, 2, 2).

In this way, the destination switch (3, 2, 2) obtains the N pieces of sub-traffic, and further, the destination switch (3, 2, 2) performs S910, and aggregates the obtained N pieces of sub-traffic to obtain the target traffic. At this point, traffic forwarding ends.

Therefore, the traffic transmission method shown in FIG. 10 may be summarized as follows:

First, intra-group balancing is performed on the target traffic. The source switch allocates the N pieces of sub-traffic to the N switches in the group.

Next, the inter-group traffic forwarding is performed. The N switches that obtain the pieces of sub-traffic separately forward the obtained pieces of sub-traffic to a group of switches whose plane identifier is the same as the plane identifier of the source switch and whose group identifier is the same as the group identifier of the destination switch.

Then, the inter-plane traffic forwarding is performed. The N switches that obtain the pieces of sub-traffic forward the obtained pieces of sub-traffic to the group of switches whose plane identifier and group identifier are the same as the plane identifier and the group identifier of the destination switch.

Finally, intra-group traffic aggregation is performed. The N−1 switches except the destination switch in the group to which the destination switch belongs forward the obtained pieces of sub-traffic to the destination switch, and the destination switch aggregates the obtained N pieces of sub-traffic to obtain the target traffic.

In an example shown in FIGS. 11, S31 and S34 respectively correspond to S21 and S24 in FIG. 10. Details are not described herein.

Different from the traffic transmission method shown in FIG. 10, the traffic transmission method shown in FIG. 11 is to first perform the inter-plane traffic forwarding and then perform the inter-group traffic forwarding, and a specific execution process is as follows:

An execution process of S32 corresponds to S907 in the method 900.

In S32, the switches (1, 1, 1) to (1, 1, N) that obtain pieces of sub-traffic separately send the obtained pieces of sub-traffic to switches (3, 1, 1) to (3, 1, N).

Specifically, the switch (1, 1, 1) forwards the obtained piece of sub-traffic to the switch (3, 1, 1), the switch (1, 1, 2) forwards the obtained piece of sub-traffic to a switch (3, 1, 2), and so on. In S32, the switches perform the inter-plane traffic forwarding, and the N switches that obtain pieces of sub-traffic forward the N pieces of sub-traffic to a group of switches whose plane identifier is the same as the plane identifier of the destination switch and whose group identifier is the same as the group identifier of the source switch.

The switch (1, 1, 1) and the switch (3, 1, 1), the switch (1, 1, 2) and the switch (3, 1, 2), . . . , and the switch (1, 1, N) and the switch (3, 1, N) are switches interconnected through an inter-plane interconnection port. Therefore, the switches (1, 1, 1) to (1, 1, N) may forward the obtained pieces of sub-traffic to corresponding switches in the switches (3, 1, 1) to (3, 1, N) through respective inter-plane interconnection ports.

An execution process of S33 corresponds to S908 in the method 900.

In S33, the switches (3, 1, 1) to (3, 1, N) separately forward the obtained pieces of sub-traffic to switches (3, 2, 1) to (3, 2, N).

Specifically, the switch (3, 1, 1) forwards the obtained piece of sub-traffic to the switch (3, 2, 1), the switch (3, 1, 2) forwards the obtained piece of sub-traffic to the switch (3, 2, 2), and so on. In S33, the switches perform the inter-group traffic forwarding, and the N pieces of sub-traffic are forwarded to a group of switches whose plane identifier and group identifier are the same as the plane identifier and the group identifier of the destination switch.

The switch (3, 1, 1) and the switch (3, 2, 1), the switch (3, 1, 2) and the switch (3, 2, 2), . . . , and the switch (3, 1, N) and the switch (3, 2, N) are switches interconnected through an inter-group interconnection port. Therefore, the switches (3, 1, 1) to (3, 1, N) may forward the obtained pieces of sub-traffic to corresponding switches in the switches (3, 2, 1) to (3, 2, N) through respective inter-group interconnection ports.

Therefore, the traffic transmission method shown in FIG. 11 may be summarized as follows:

First, intra-group balancing is performed on the target traffic. The source switch allocates the N pieces of sub-traffic to the N switches in the group.

Next, the inter-plane traffic forwarding is performed. The N switches that obtain the pieces of sub-traffic separately forward the N pieces of sub-traffic to the group of switches whose plane identifier is the same as the plane identifier of the destination switch and whose group identifier is the same as the group identifier of the source switch.

Then, the inter-group traffic forwarding is performed. The N switches that obtain the pieces of sub-traffic forward the obtained pieces of sub-traffic to the group of switches whose plane identifier and group identifier are the same as the plane identifier and the group identifier of the destination switch.

Finally, intra-group traffic aggregation is performed. The N−1 switches except the destination switch in the group to which the destination switch belongs forward the obtained pieces of sub-traffic to the destination switch, and the destination switch aggregates the obtained N pieces of sub-traffic to obtain the target traffic.

It should be understood that the traffic transmission methods shown in FIG. 9A and FIG. 9B to FIG. 11 are merely examples, and should not constitute any limitation on this embodiment of this disclosure, and another traffic forwarding method obtained based on the traffic transmission methods exemplified in this embodiment of this disclosure should fall within the protection scope of this embodiment of this disclosure. For example, in this embodiment of this disclosure, first, inter-plane traffic balancing may alternatively be performed, next, the inter-group traffic forwarding is performed, then, intra-group traffic forwarding is performed, and finally, inter-plane traffic aggregation is performed. The switch (1, 1, 1) separately sends the N−1 pieces of sub-traffic to an inter-plane direct connection switch (P, 1, 1), next, a switch (Q, 1, 1) forwards an obtained piece of sub-traffic to an inter-group interconnection switch (Q, 2, 1), then, the switch (Q, 2, 1) forwards the obtained piece of sub-traffic to an intra-group interconnection switch (Q, 2, 2), and finally, a switch (W, 2, 2) forwards the obtained piece of sub-traffic to an inter-plane interconnection switch (3, 2, 2), where P=2, 3, . . . , and N, Q=1, 2, . . . , and N, and W=1, 3, . . . , and N. Alternatively, first, inter-group traffic balancing may be performed, next, the inter-plane traffic forwarding is performed, then, the intra-group traffic forwarding is performed, and finally, inter-group traffic aggregation is performed. The switch (1, 1, 1) separately sends the N−1 pieces of sub-traffic to an inter-group direct connection switch (1, P, 1), next, a switch (1, Q, 1) forwards an obtained piece of sub-traffic to an inter-plane interconnection switch (3, Q, 1), then, the switch (3, Q, 1) forwards the obtained piece of sub-traffic to an inter-group interconnection switch (3, Q, 2), and finally, a switch (3, W, 2) forwards the obtained piece of sub-traffic to an inter-group interconnection switch (3, 2, 2), where P=2, 3, . . . , and N, Q=1, 2, . . . , and N, and W=1, 3, . . . , and N.

The foregoing describes in detail the traffic transmission methods according to the embodiments of this disclosure with reference to FIG. 9A and FIG. 9B to FIG. 11. It can be learned from the foregoing description that the traffic transmission methods according to the embodiments of this disclosure use unequal-cost multi-path forwarding. To implement forwarding of the target traffic between any two switches in the DCN, a transmission path between every two switches in the DCN needs to be pre-determined. The following describes in detail how to determine the transmission path between the any two switches in the DCN with reference to FIG. 12 to FIG. 14.

Figure 12:
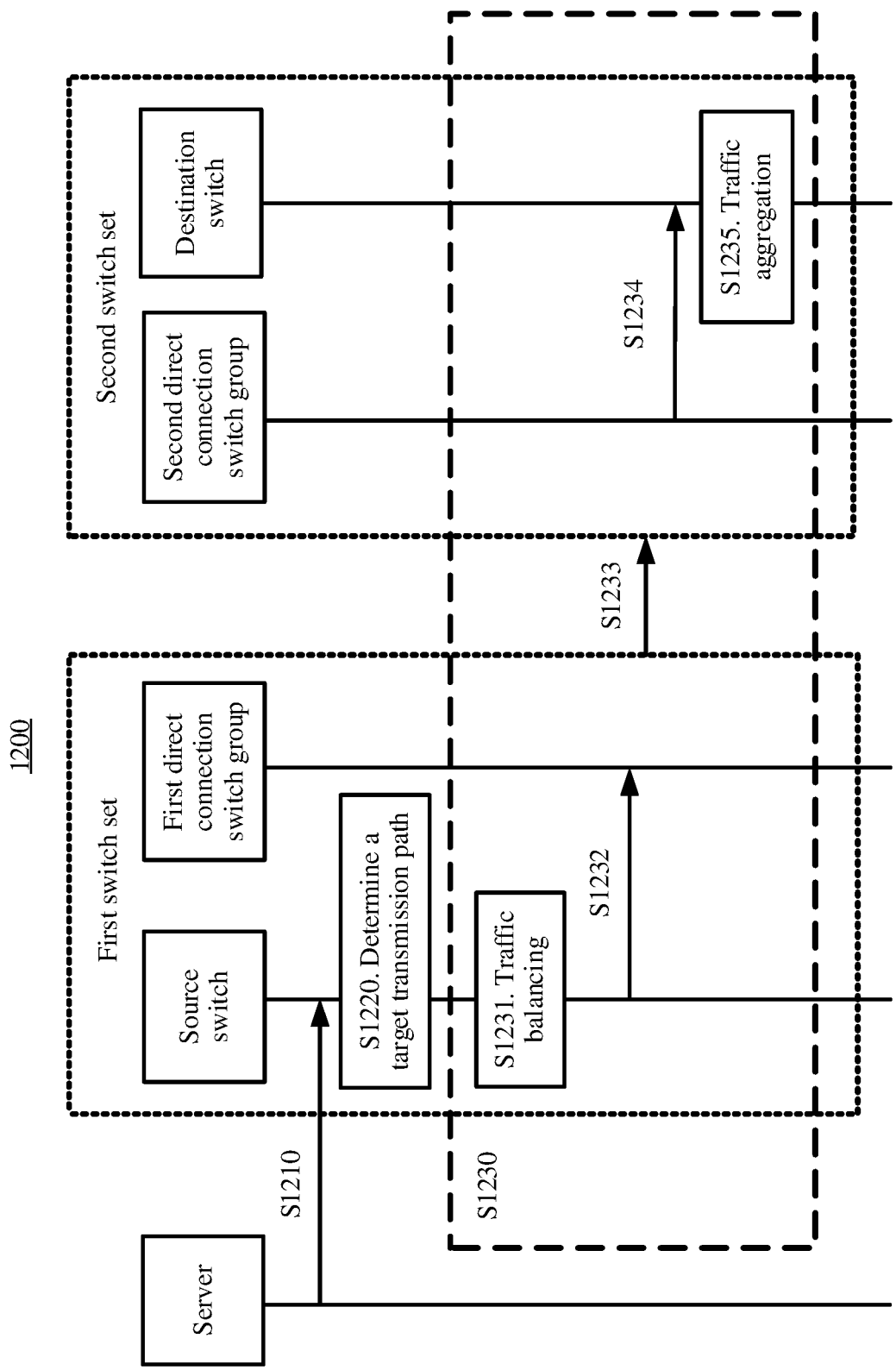
FIG. 12 is a schematic flowchart of a traffic transmission method in a DCN according to another embodiment of this disclosure.

FIG. 12 is a schematic flowchart of a traffic transmission method 1200 in a DCN according to another embodiment of this disclosure. The method 1200 may be applied to a DCN in the foregoing embodiment, such as the DCN 100 shown in FIG. 1.

As shown in FIG. 12, the method 1200 may include the following content:

S1210. A source switch receives target traffic sent by a server.

S1220. The source switch determines a target transmission path from the source switch to a destination switch based on a pre-stored transmission path set, where the pre-stored transmission path set includes a transmission path between any two switches in the DCN, and the transmission path between every two switches includes a plurality of transmission paths.

S1230. The source switch sends the target traffic to the destination switch over the target transmission path.

The source switch is any switch in the DCN, and the destination switch is any switch except the source switch in the DCN.

It should be understood that, in this embodiment of this disclosure, the foregoing transmission path set may be pre-stored in each switch, or the foregoing transmission path set may be stored in a shared memory. When the target traffic needs to be forwarded, each switch may obtain the transmission path set from the shared memory, and query the target transmission path from the source switch to the destination switch in the transmission path set, so as to forward the target traffic based on the target transmission path.

Therefore, in the traffic transmission method in this embodiment of this disclosure, the target transmission path from the source switch to the destination switch is pre-determined. When traffic is forwarded, the target traffic may be forwarded only by needing to query the pre-stored transmission path set, so that a traffic forwarding delay can be shortened.

Optionally, in this embodiment of this disclosure, the method 1200 further includes: generating the target transmission path from the source switch to the destination switch; and adding the target transmission path to the transmission path set.

The transmission path between the any two switches in the DCN is determined, and the transmission path between the two switches is added to the transmission path set. In this way, when traffic is forwarded between the any two switches in the DCN, the transmission path between the two switches may be obtained only by needing to query the transmission path set.

For example, in the transmission path set, a transmission path from a source switch (1, 1, 1) to a destination switch (3, 2, 2) may include a transmission path in S21, S22, S23, and S24 shown in FIG. 10, and may specifically include (1, 1, 1)→(1, 1, P), (1, 1, Q)→(1, 2, Q)→(3, 2, Q), and (3, 2, W)→(3, 2, 2), where P=2, . . . , and N, Q=1, 2, . . . , and N, and W=1, 3, . . . , and N.

Alternatively, in the transmission path set, a transmission path from a source switch (1, 1, 1) to a destination switch (3, 2, 2) may include a transmission path in S31, S32, S33, and S34 shown in FIG. 11, and may specifically include (1, 1, 1)→(1, 1, P), (1, 1, Q)→(3, 1, Q)→(3, 2, Q), and (3, 2, W)→(3, 2, 2), where P=2, . . . , and N, Q=1, 2, . . . , and N, and W=1, 3, . . . , and N.

In a specific embodiment, the generating the target transmission path from the source switch to the destination switch may include: determining a first path set, where the first path set includes a one-hop reachable transmission path between switches in the DCN; determining a first switch set and a second switch set, where the first switch set includes the source switch and all direct connection switches of the source switch, and the second switch set includes the destination switch and all direct connection switches of the destination switch; determining a second path set from a switch in the first switch set to a switch in the second switch set based on the first path set; and determining the target transmission path from the source switch to the destination switch based on the first path set and the second path set, where the target transmission path includes a plurality of transmission paths from the source switch to the destination switch.

The first path set includes all one-hop reachable paths in an entire network. For example, the DCN includes a first switch, and then the first path set may include a one-hop path between the first switch and each switch in K direct connection switch groups of the first switch.

For example, for a specific example shown in FIG. 10 or FIG. 11, the first path set may include N−1 transmission paths between the switch (1, 1, 1) and a switch (1, 1, P), N−1 transmission paths between the switch (1, 1, 1) and a switch (1, Q, 1), and N−1 transmission paths between the switch (1, 1, 1) and a switch (W, 1, 1), where P=2, . . . , and N, Q=2, . . . , and N, and W=2, . . . , and N.

In this embodiment of this disclosure, the first switch set includes the source switch and all the direct connection switches of the source switch, namely, K direct connection switch groups of the source switch, and the second switch set includes the destination switch and all the direct connection switches of the destination switch, namely, K direct connection switch groups of the destination switch.

For example, the source switch is (1, 1, 1), the destination switch is (3, 2, 2), the first switch set may include (1, 1, P), (1, Q, 1), and (W, 1, 1), and the second switch set includes (3, 2, P), (3, Q, 2), and (W, 2, 2), where P=1, 2, . . . , and N, Q=1, 2, . . . , and N, and W=1, 2, . . . , and N.

The second path set from the switch in the first switch set to the switch in the second switch set may be determined based on the first path set. The second path set includes a transmission path from the source switch and all the direct connection switches of the source switch to the destination switch and all the direct connection switches of the destination switch, and the transmission path in the second path set is one or more hops.

For example, the source switch is (1, 1, 1), the destination switch is (3, 2, 2), the second path set includes a forwarding path in S22 and S23 shown in FIG. 10, and may specifically include (1, 1, Q)→(1, 2, Q)→(3, 2, Q), or the second path set may include a transmission path in S32 and S33 shown in FIG. 11, and may specifically include (1, 1, Q)→(3, 1, Q)→(3, 2, Q), where Q=1, 2, . . . , and N, or the second path set may include (1, 1, Q)→(1, 3, Q)→(3, 3, Q)→(3, 2, Q), (1, Q, 1)→(1, Q, 2)→(3, Q, 2), or the like.

After the second path set is determined, the target transmission path from the source switch to the destination switch may be further determined based on the first path set and the second path set.

In a specific embodiment, the determining the target transmission path from the source switch to the destination switch based on the first path set and the second path set includes: determining a first transmission path group in the second path set, where the first transmission path group includes N transmission paths with a minimum hop count from the source switch and a first direct connection switch group interconnected with the source switch to the destination switch and a second direct connection switch group interconnected with the destination switch, the first direct connection switch group is any direct connection switch group interconnected with the source switch, and the second direct connection switch group is any direct connection switch group interconnected with the destination switch; determining, in the first path set, a second transmission path group from the source switch to the first direct connection switch group, and a third transmission path group from the second direct connection switch group to the destination switch, where the second transmission path group includes N−1 transmission paths from the source switch to the first direct connection switch group, and the third transmission path group includes N−1 transmission paths from the second direct connection switch group to the destination switch; and determining the target transmission path from the source switch to the destination switch based on the second transmission path group, the first transmission path group, and the third transmission path group.

Specifically, the second path set may include all reachable transmission paths from the switch in the first switch set to the switch in the second switch set, A hop count of the transmission path from the switch in the first switch set to the switch in the second switch set may be different in the second path set. Therefore, the N transmission paths with the minimum hop count from the source switch and the first direct connection switch group interconnected with the source switch to the destination switch and the second direct connection switch group interconnected with the destination switch may be determined in the second path set, and the N transmission paths with the minimum hop count are denoted as the first transmission path group. The first direct connection switch group includes N−1 switches directly connected to the source switch, that is, the first switch set includes N switches. The second direct connection switch group includes N−1 switches directly connected to the destination switch, that is, the second switch set includes N switches. The N transmission paths included in the first transmission path group are respectively used to connect the N switches in the first switch set to the N switches in the second switch set, or in other words, the switch in the first switch set may transmit traffic to a corresponding switch in the second switch set over a corresponding transmission path.

For example, the first transmission path group includes the forwarding path in S22 and S23 shown in FIG. 10, The N transmission paths included in the first transmission path group are (1, 1, Q)→(1, 2, Q)→(3, 2, Q), where Q=1, 2, . . . , and N. A transmission path corresponding to the switch (1, 1, 1) in the first switch set is (1, 1, 1)→(1, 2, 1)→(3, 2, 1). Therefore, the switch (1, 1, 1) may forward traffic to the switch (3, 2, 1) over a transmission path (1, 1, 1)→(1, 2, 1)→(3, 2, 1). Similarly, a transmission path corresponding to a switch (1, 1, N) is (1, 1, 1)→(1, 2, 1)→(3, 2, 1), and the switch (1, 1, N) may forward traffic to the switch (3, 2, N) over a transmission path (1, 1, N)→(1, 2, N)→(3, 2, N).

After the first transmission path group is determined in the second path set, a transmission path between a first hop and a last hop from the source switch to the destination switch is relatively determined. Further, the N−1 transmission paths from the source switch to the N−1 switches in the first direct connection switch group of the source switch may be determined (the N−1 transmission paths are denoted as the second transmission path group). In other words, the first hop from the source switch to the destination switch is determined. The N−1 transmission paths from the N−1 switches in the second direct connection switch group of the destination switch to the destination switch are determined (the N−1 transmission paths are denoted as the third transmission path group). In other words, the last hop from the source switch to the destination switch is determined. At this point, the first hop, the last hop, and the transmission path between the first hop and the last hop from the source switch to the destination switch are determined, and then, the target transmission path from the source switch to the destination switch may be determined based on the first transmission path group, the second transmission path group, and the third transmission path group. Specifically, a combined path of the second transmission path group, the first transmission path group, and the third transmission path group may be used as the target transmission path from the source switch to the destination switch.

For example, the source switch is (1, 1, 1), the destination switch is (3, 2, 2), and the first transmission path group may include the forwarding path in S22 and S23 shown in FIG. 10, that is, the N transmission paths included in the first transmission path group are (1, 1, Q)→(1, 2, Q)→(3, 2, Q), where Q=1, 2, . . . , and N. Then, the N−1 transmission paths included in the second transmission path group may be (1, 1, 1)→(1, 1, P), where P=2, . . . , and N. The N−1 transmission paths included in the third transmission path group may be (3, 2, W)→(3, 2, 2), where W=1, 3, . . . , and N. The first transmission path group, the second transmission path group, and the third transmission path group are combined to obtain the target transmission path: (1, 1, 1)→(1, 1, P) (corresponding to S21 in FIG. 10), (1, 1, Q)→(1, 2, Q)→(3, 2, Q) (corresponding to S22 and S23 in FIG. 10), and (3, 2, W)→(3, 2, 2) (corresponding to S24 in FIG. 10), where P=2, . . . , and N, Q=1, 2, . . . , and N, and W=1, 3, . . . , and N, that is, the obtained target transmission path may be the transmission path shown in S21, S22, S23, and S24 in FIG. 10.

It should be noted that, in this embodiment of this disclosure, the first direct connection switch group is N−1 direct connection switches of the source switch. For example, the first direct connection switch group may be an intra-group direct connection switch group, an inter-group direct connection switch group or a planar direct connection switch group of the source switch, and in the first hop, the source switch may separately forward N−1 pieces of sub-traffic to the N−1 switches of the first direct connection switch group. The second direct connection switch group is N−1 direct connection switches of the destination switch. For example, the second direct connection switch group may be an intra-group direct connection switch group, an inter-group direct connection switch group or a planar direct connection switch group of the destination switch. In the last hop, the N−1 switches in the second direct connection switch group forward the N−1 pieces of sub-traffic to the destination switch.

After the target transmission path from the source switch to the destination switch is obtained, further, S1230 may include the following steps.

S1231. The source switch performs traffic balancing on the target traffic to obtain N pieces of sub-traffic.

S1232. The source switch separately sends N−1 pieces of sub-traffic in the N pieces of sub-traffic to N−1 direct connection switches in the first direct connection switch group over the N−1 transmission paths in the second transmission path group.

Optionally, when the DCN is a three-level structure, and the first direct connection switch group is an intra-group direct connection switch group, an execution process of S1231 and S1232 may correspond to S901 in the method 900 shown in FIG. 9A and FIG. 9B, S21 in the example shown in FIG. 10, or S31 in the example shown in FIG. 11.

S1233. The source switch and the first direct connection switch group separately send the N pieces of sub-traffic to the destination switch and N−1 direct connection switches in the second direct connection switch group over the N transmission paths in the first transmission path group.

As described above, a head end of each transmission path in the first transmission path is a switch in the first switch set, and a tail end is a switch in the second switch set. The N switches in the first switch set may be connected to the corresponding N switches in the second switch set over the N transmission paths in the first transmission path group. In this way, a switch in the first switch set may forward one obtained piece of sub-traffic to a switch at an end of the transmission path over a corresponding transmission path, namely, a switch in the second switch set. For example, the first switch set includes a first switch, the second switch set includes a second switch, the first transmission path group includes a first transmission path, the first transmission path is a transmission path from the first switch to the second switch, and the first switch may forward the obtained piece of sub-traffic to the second switch over the first transmission path.

Optionally, when the DCN is the three-level structure, the first direct connection switch group is an intra-group direct connection switch group of the source switch, and the second direct connection switch group is an intra-group direct connection switch group of the destination switch, an execution process of S1233 may correspond to S905 and S906, or S907 and S908 in the method 900 shown in FIG. 9A and FIG. 9B, S22 and S23 in the example shown in FIG. 10, or S32 and S33 in the example shown in FIG. 11.

S1234. The N−1 switches in the second direct connection switch group send the N−1 pieces of sub-traffic to the destination switch over the N−1 transmission paths in the third transmission path group.

Optionally, when the DCN is the three-level structure, the first direct connection switch group is the intra-group direct connection switch group of the source switch, and the second direct connection switch group is the intra-group direct connection switch group of the destination switch, an execution process of S1234 may correspond to S909 in the method 900 shown in FIG. 9A and FIG. 9B, S24 in the example shown in FIG. 10, or S34 in the example shown in FIG. 11. Details are not described herein again.

S1235. The destination switch aggregates the received N pieces of sub-traffic to obtain the target traffic.

An execution process of S1235 may correspond to S910 in the method 900 shown in FIG. 9A and FIG. 9B. Details are not described herein again.

The following describes an execution process of S1233 with reference to FIG. 13 and FIG. 14 by using an example in which K=3, that is, the DCN is a three-level structure.

In a specific implementation, as shown in FIG. 13, S1233 may include the following steps.

S41. A first switch sends, over a first transmission sub-path in the first transmission path group, an obtained piece of sub-traffic to a second switch whose plane identifier is the same as a plane identifier of the source switch, whose group identifier is the same as a group identifier of the destination switch, and whose intra-group identifier is the same as an intra-group identifier of the first switch, where the first switch is the source switch or any switch in the first direct connection switch group, and the first transmission sub-path is a transmission path from the first switch to the second switch.

Specifically, an execution process of S41 may correspond to S905 in the method 900 shown in FIG. 9A and FIG. 9B, or S22 in the specific example shown in FIG. 10. For a detailed execution process, refer to related descriptions in the foregoing embodiment. Details are not described herein again.

In this embodiment, the first transmission path group includes transmission paths in S22 and S23, and the first transmission sub-path is a transmission path in S22. For example, the first switch is (1, 1, P), the second switch is (1, 2, P), and the first transmission sub-path is (1, 1, P)→(1, 2, P), where P=1, 2, ..., and N.

S42. The second switch sends, over a second transmission sub-path in the first transmission path group, the received piece of sub-traffic to a third switch whose plane identifier and group identifier are the same as a plane identifier and the group identifier of the destination switch and whose intra-group identifier is the same as the intra-group identifier of the second switch, where the third switch is the destination switch or any switch in the second direct connection switch group, and the second transmission sub-path is a transmission path from the second switch to the third switch.

Specifically, an execution process of S42 may correspond to S906 in the method 900 shown in FIG. 9A and FIG. 9B, or S23 in the specific example shown in FIG. 10. For a detailed execution process, refer to related descriptions in the foregoing embodiment. Details are not described herein again.

In this embodiment, the first transmission path group includes the transmission paths in S22 and S23, and the second transmission sub-path is a transmission path in S23. For example, the second switch is (1, 2, P), the third switch is (3, 2, P), and the second transmission sub-path is (1, 2, P)→(3, 2, P), where P=1, 2, ..., and N.

In another specific implementation, as shown in FIG. 14, S1233 may include the following steps.

S51. A first switch sends, over a first transmission sub-path in the first transmission path group, an obtained piece of sub-traffic to a second switch whose plane identifier is the same as a plane identifier of the destination switch, whose group identifier is the same as a group identifier of the source switch, and whose intra-group identifier is the same as an intra-group identifier of the first switch, where the first switch is the source switch or any switch in the first direct connection switch group, and the first transmission sub-path is a transmission path from the first switch to the second switch.

Specifically, an execution process of S51 may correspond to S907 in the method 900 shown in FIG. 9A and FIG. 9B, or S32 in the specific example shown in FIG. 11. For a detailed execution process, refer to related descriptions in the foregoing embodiment. Details are not described herein again. In this embodiment, the first transmission path group includes transmission paths in S32 and S33, and the first transmission sub-path is a transmission path in S32. For example, the first switch is (1, 1, P), the second switch is (3, 1, P), and the first transmission sub-path is (1, 1, P)→(3, 1, P), where P=1, 2, ..., and N.

S52. The second switch sends, over a second transmission sub-path in the first transmission path group, the received piece of sub-traffic to a third switch whose plane identifier and group identifier are the same as the plane identifier and a group identifier of the destination switch and whose intra-group identifier is the same as the intra-group identifier of the second switch, where the third switch is the destination switch or any switch in the second direct connection switch group, and the second transmission sub-path is a transmission path from the second switch to the third switch.

Specifically, an execution process of S52 may correspond to S908 in the method 900 shown in FIG. 9A and FIG. 9B, or S33 in the specific example shown in FIG. 11. For a detailed execution process, refer to related descriptions in the foregoing embodiment. Details are not described herein again. In this embodiment, the first transmission path group includes the transmission paths in S32 and S33, and the second transmission sub-path is a transmission path in S33. For example, the second switch is (3, 1, P), the third switch is (3, 2, P), and the second transmission sub-path is (3, 1, P)→(3, 2, P), where P=1, 2, ..., and N. Therefore, according to the traffic transmission method in the DCN in this embodiment of this disclosure, a maximum of four hops may be required from the source switch to the destination switch. However, when a conventional Clos structure is used, five layers of network devices need to be established in a case of a same switching capacity, and corresponding traffic forwarding requires eight hops. Therefore, the traffic transmission method in this embodiment of this disclosure can reduce routing complexity and in addition help reduce a transmission delay.

An embodiment of this disclosure further provides a computer-readable storage medium. The computer-readable storage medium stores one or more programs, and the one or more programs include an instruction. When executed by a portable electronic device that includes a plurality of disclosure programs, the instruction enables the portable electronic device to perform the method in the embodiments shown in FIG. 9A and FIG. 9B to FIG. 14.

An embodiment of this disclosure further provides a computer program product. The computer program product includes an instruction. When executed by a computer, the computer program enables the computer to execute the corresponding procedures of the method in the embodiments shown in FIG. 9A and FIG. 9B to FIG. 14.

It should be understood that specific examples in this disclosure are merely intended to help a person skilled in the art better understand the embodiments of this disclosure, but not to limit the scope of the embodiments of this disclosure.

It should be further understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for a specific process of the method described above, refer to a corresponding description in the foregoing apparatus embodiments. Details are not described herein.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this disclosure.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure may be implemented in the form of a software product. The computer software product is stored in a storage medium and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific embodiments of this disclosure, but are not intended to limit the protection scope of this disclosure. Any modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A data center network (DCN) comprising:
N first-level subnetworks,
wherein each first-level subnetwork comprises N second-level subnetworks,
wherein each $k^{th}$-level subnetwork comprises N $(k+1)^{th}$-level subnetworks,
wherein each $(K-1)^{th}$-level subnetwork comprises switches,
wherein N, K, and k are integers,
wherein N≥2, K≥2, 1<k<K,
wherein the DCN is a K-level network,
wherein the switches comprise a first switch,
wherein the first switch comprises K subnetwork identifiers,
wherein each of the K subnetwork identifiers indicates a level of subnetwork to which the first switch belongs and a number of the first switch in a $(K-1)^{th}$-level subnetwork to which the switch belongs,
wherein the first switch is interconnected with each of the remaining switches in K direct connection switch groups,
wherein each K direct connection switch group comprises N−1 switches of the switches,
wherein an $i^{th}$-level subnetwork identifier of the N−1 switches comprised in an $i^{th}$ direct connection switch group of the K direct connection switch groups is different from an $i^{th}$-level subnetwork identifier of the first switch and is the same as other K−1 subnetwork identifiers of the first switch, and
wherein i=1, . . . , and K.

2. The DCN of claim 1, wherein the first switch comprises K interconnection port groups, wherein each of the K interconnection port groups comprises N−1 interconnection ports, wherein the K interconnection port groups correspond to the K direct connection switch groups, and wherein the N−1 interconnection ports in each of the K interconnection port group is configured to connect N−1 switches in a corresponding direct connection switch group.

3. The DCN of claim 2, wherein K is 3, wherein the N first-level subnetworks are planes, wherein the N second-level subnetworks are groups, wherein identifiers of the N first-level subnetworks are plane identifiers, wherein identifiers of the N second-level subnetworks are group identifiers, wherein identifiers of third-level subnetworks are intra-group identifiers, wherein a first direct connection switch group in the K direct connection switch groups is a planar direct connection switch group and comprises N−1 switches whose plane identifier is different from a plane identifier of the first switch, whose group identifier is the same as a group identifier of the first switch, and whose intra-group identifier is the same as an intra-group identifier of the first switch, wherein a second direct connection switch group is an inter-group direct connection switch group and comprises N−1 switches whose group identifier is different from the group identifier of the first switch, whose plane identifier is the same as the plane identifier of the first switch, and whose intra-group identifier is the same as the intra-group identifier of the first switch, wherein a third direct connection switch group is an intra-group direct connection switch group and comprises N−1 switches whose intra-group identifier is different from the intra-group identifier of the first switch, whose plane identifier is the same as the plane identifier of the first switch, and whose group identifier is the same as the group identifier of the first switch.

4. The DCN of claim 3, wherein the K interconnection port groups comprise an inter-plane interconnection port group, an inter-group interconnection port group, and an intra-group interconnection port group, wherein the inter-plane interconnection port group comprises N−1 inter-plane interconnection ports, wherein the inter-group interconnection port group comprises N−1 inter-group interconnection ports, wherein the intra-group interconnection port group comprises N−1 intra-group interconnection port, wherein the N−1 inter-plane interconnection ports are configured to connect the N−1 switches in the planar direct connection switch group, wherein the N−1 inter-group interconnection ports are configured to connect the N−1 switches in the inter-group direct connection switch group, and wherein the N−1 intra-group interconnection ports are configured to connect the N−1 switches in the intra-group direct connection switch group.

5. The DCN of claim 2, wherein the K interconnection port groups of the first switch are connected to the K direct connection switch groups through K cyclic arrayed waveguide gratings (CAWGs), wherein each of the K CAWGs comprises N input optical fibers and N output optical fibers, wherein the N−1 interconnection ports in each interconnection port group of the first switch comprise N−1 input ports and N−1 output ports, wherein the N−1 output ports in each interconnection port group of the first switch are connected to an input optical fiber of a first CAWG in the K CAWGs, and wherein the N−1 input ports in the interconnection port group are connected to an output optical fiber of the first CAWG.

6. A traffic transmission method implemented by a source switch in a data center network (DCN), the traffic transmission method comprising:

receiving target traffic from a server;

determining a target transmission path from the source switch to a destination switch based on a pre-stored transmission path set, wherein the pre-stored transmission path set comprises a transmission path between every two switches in the DCN, and wherein each transmission path comprises a plurality of sub-transmission paths;

sending the target traffic to the destination switch over the target transmission path;

determining a first path set, wherein the first path set comprises a one-hop reachable transmission path between switches in the DCN;

determining a first switch set and a second switch set, wherein the first switch set comprises the source switch and all direct connection switches of the source switch, and wherein the second switch set comprises the destination switch and all direct connection switches of the destination switch;

determining a second path set from a switch in the first switch set to a switch in the second switch set based on the first path set; and further determining the target transmission path based on the first path set and the second path set, wherein the target transmission path comprises a plurality of sub-transmission paths from the source switch to the destination switch.

7. The traffic transmission method of claim 6, further comprising:

generating the target transmission path; and adding the target transmission path to the transmission path set.

8. The traffic transmission method of claim 6, further comprising determining a first transmission path group in the second path set, wherein the first transmission path group comprises N sub-transmission paths with a minimum hop count from the source switch and a first direct connection switch group interconnected with the source switch to the destination switch and a second direct connection switch group interconnected with the destination switch, wherein the first direct connection switch group is interconnected with the source switch, and wherein the second direct connection switch group is interconnected with the destination switch.

9. The traffic transmission method of claim 8, further comprising determining, from the first path set, a second transmission path group from the source switch to the first direct connection switch group and a third transmission path group from the second direct connection switch group to the destination switch, wherein the second transmission path group comprises N−1 sub-transmission paths from the source switch to the first direct connection switch group, and wherein the third transmission path group comprises N−1 sub-transmission paths from the second direct connection switch group to the destination switch.

10. The traffic transmission method of claim 9, further determining the target transmission path further based on the second transmission path group, the first transmission path group, and the third transmission path group.

11. The traffic transmission method of claim 10, further comprising performing traffic balancing on the target traffic to obtain N pieces of sub-traffic.

12. The traffic transmission method of claim 11, separately sending N−1 pieces of sub-traffic in the N pieces of sub-traffic to N−1 direct connection switches in the first direct connection switch group over the N−1 sub-transmission paths in the second transmission path group.

13. The traffic transmission method of claim 12, further comprising separately sending the N pieces of sub-traffic to the destination switch and N−1 direct connection switches in the second direct connection switch group over the N sub-transmission paths in the first transmission path group.

14. A source switch in a data center network (DCN), the source switch comprising:
K direct connection switch groups;
K interconnection port groups configured to respectively connect the K direct connection switch groups;
an access port configured to connect to a server; and
a switching chip configured to:
receive, from the server and through the access port, target traffic,
determine a target transmission path from the source switch to a destination switch based on a pre-stored transmission path set, wherein the pre-stored transmission path set comprises a transmission path between every two switches in the DCN, and wherein each transmission path comprises a plurality of sub-transmission paths,
send the target traffic to the destination switch over the target transmission path,
determine a first path set, wherein the first path set comprises a one-hop reachable transmission path between switches in the DCN;
determine a first switch set and a second switch set, wherein the first switch set comprises the source switch and all direct connection switches of the source switch, and wherein the second switch set comprises the destination switch and all direct connection switches of the destination switch;
determine a second path set from a switch in the first switch set to a switch in the second switch set based on the first path set; and
further determine the target transmission path based on the first path set and the second path set,
wherein the target transmission path comprises a plurality of sub-transmission paths from the switch to the destination switch.

15. The source switch of claim 14, wherein the source switch further comprises a processor configured to:
generate the target transmission path; and
add the target transmission path to the transmission path set.

16. The source switch of claim 14, wherein the source switch further comprises a processor configured to:
determine a first transmission path group in the second path set, wherein the first transmission path group comprises N sub-transmission paths with a minimum hop count from the source switch and a first direct connection switch group interconnected with the source switch to the destination switch and a second direct connection switch group interconnected with the destination switch, wherein the first direct connection switch group is interconnected with the source switch, and wherein the second direct connection switch group is interconnected with the destination switch;
determine, from the first path set, a second transmission path group from the source switch to the first direct connection switch group and a third transmission path group from the second direct connection switch group to the destination switch, wherein the second transmission path group comprises N−1 sub-transmission paths from the source switch to the first direct connection switch group, and wherein the third transmission path group comprises N−1 transmission paths from the second direct connection switch group to the destination switch; and
determine the target transmission path further based on the second transmission path group, the first transmission path group, and the third transmission path group.

17. The source switch of claim 16, wherein the switching chip is further configured to:
perform traffic balancing on the target traffic to obtain N pieces of sub-traffic; and
separately send N−1 pieces of sub-traffic in the N pieces of sub-traffic to N−1 direct connection switches in the first direct connection switch group over the N−1 transmission paths in the second transmission path group.

18. The source switch of claim 17, wherein K is 3, wherein a first-level subnetwork of the DCN is a plane, wherein a second-level subnetwork is a group, wherein an identifier of the first-level subnetwork is a plane identifier, wherein an identifier of the second-level subnetwork is a group identifier, wherein an identifier of a third-level subnetwork is an intra-group identifier, and wherein a first direct connection switch group in the K direct connection switch groups is a planar direct connection switch group and comprises N−1 switches whose plane identifier is different from a plane identifier of the source switch, whose group identifier is the same as a group identifier of the source switch, and whose intra-group identifier is the same as an intra-group identifier of the source switch.

19. The source switch of claim 18, wherein a second direct connection switch group is an inter-group direct connection switch group and comprises N−1 switches whose group identifier is different from the group identifier of the source switch, whose plane identifier is the same as the plane identifier of the source switch, and whose intra-group identifier is the same as the intra-group identifier of the source switch.

20. The source switch of claim 19, wherein a third direct connection switch group is an intra-group direct connection switch group and comprises N−1 switches whose intra-group identifier is different from the intra-group identifier of the source switch, whose plane identifier is the same as the plane identifier of the source switch, and whose group identifier is the same as the group identifier of the source switch.

* * * * *